(12) United States Patent
Giroti

(10) Patent No.: US 7,751,347 B2
(45) Date of Patent: Jul. 6, 2010

(54) CONVERGED CONFERENCING APPLIANCE METHODS FOR CONCURRENT VOICE AND DATA CONFERENCING SESSIONS OVER NETWORKS

(75) Inventor: Sudhir K. Giroti, Acton, MA (US)

(73) Assignee: Azurn Networks, Inc., Waltham, MA (US)

( * ) Notice: Subject to any disclaimer, the term of this patent is extended or adjusted under 35 U.S.C. 154(b) by 1702 days.

(21) Appl. No.: 10/423,615

(22) Filed: Apr. 25, 2003

(65) Prior Publication Data

US 2004/0034723 A1    Feb. 19, 2004

Related U.S. Application Data

(60) Provisional application No. 60/375,558, filed on Apr. 25, 2002.

(51) Int. Cl.
*H04L 12/16* (2006.01)
(52) U.S. Cl. ..................................... 370/260
(58) Field of Classification Search ......... 370/260–261; 709/204, 205; 379/202.01, 93.15, 90.01; 348/14.08, 14.09
See application file for complete search history.

(56) References Cited

U.S. PATENT DOCUMENTS

| | | | | |
|---|---|---|---|---|
| 6,657,975 B1 * | 12/2003 | Baxley et al. | ............... | 370/260 |
| 6,754,323 B1 * | 6/2004 | Chang et al. | ........... | 379/205.01 |
| 6,782,413 B1 * | 8/2004 | Loveland | .................... | 709/204 |
| 6,816,468 B1 * | 11/2004 | Cruickshank | ............... | 370/260 |
| 2004/0030749 A1 * | 2/2004 | Bowman-Amuah | ......... | 709/204 |

* cited by examiner

*Primary Examiner*—Stella L Woo
(74) *Attorney, Agent, or Firm*—Mark Levy; Hinman, Howard & Kattell

(57) ABSTRACT

A converged conferencing appliance having at least one voice port and one data port for managing multi-device conferences allowing multiple participants to concurrently connect diverse devices over public switched, mobile, IP, wireless local or wide area, personal networks, and cable or fixed wireless networks. Each of the ports can be connected to an individual, respective device and all of the ports can be configured for simultaneous operation. In addition to the voice and data ports, at least one broadband port and at least one wireless port can be provided in the appliance. A mechanism is also provided to synchronize multi-modal communications and conferences among a number of users. Participants may participate in integrated voice, data and video conferences by simultaneously connecting from one or more devices such as traditional phones, mobile phones, voice and data capable smart phones, computers, VoIP devices, wireless devices and other intelligent handheld devices.

8 Claims, 31 Drawing Sheets

| Voice Port Protocols supported |
|---|
| Analog Loop Start |
| Australian P2 Protocol |
| European digital channel associated signaling protocols |
| Feature Group D protocol |
| Ground start protocols |
| MF-socotel protocol |
| Multi-frequency compelled protocols based on the R2 standards (MFC) |
| NEC PBX protocol |
| Off-premises station protocol |
| Operator workstation protocol |
| Pulsed E and M protocols |
| SS5 (Signaling System 5) |
| System R1.5 protocols |
| Digital and analog wink start protocols |

SCHEDULE CONFERENCE — 215

- Participants — 216
- Schedule Time — 217
- Mode (Voice/Data/Video) — 218
- Upload Files — 219
- Notifications — 220
- Email — 221

222:

| PARTICIPANTS<br>John Smith<br>Jane Dow<br>Joe Schmo |
| TIME<br>Apr 5, 2003 10:00am<br>(Boston, Mass, USA) |
| DURATION<br>1 hour, 30 minutes |
| FILES SHARED |
| NOTIFICATIONS: Y |
| EMAIL: Y |

| | |
|---|---|
| *1 | Mute |
| *2 | Un Mute |
| *3 <number> | Forward the call to another phone number given by <number> |
| *4 | Get all files being shared to my email |
| *5 | Get contact info, email of all participants in my email |
| *6 <Telephone Number> | Conference another party |
| *7 | Remove a party from the conference (that this user has initiated) |
| *8 <participant number> | Do one-to-one consultation with another participant |
| *9 | Hear list of participants on the voice and data side |
| *0 | Help, Time Remaining & Status of Conference |
| #1 <organizer code> | Enable Organizer functions |
| #2 | Disable Organizer functions |
| #3 <user number> | Mute a user |
| #4 <user number> | UnMute a user |
| #5 | Send contact info and email of all to everyone |
| #6 <Telephone number> x n | Conference many parties simultaneously |
| #7 <Participant number> | Remove a party from the conference |
| #8 <participant num> x n | Do private conversation with a subset |
| #9 Status | Status of the conference |
| #0 Help | Help, Time Remaining, time extension etc. |

FIG 29

CONVERGED CONFERENCING APPLIANCE METHODS FOR CONCURRENT VOICE AND DATA CONFERENCING SESSIONS OVER NETWORKS

RELATED APPLICATION

This continuation-in-part application claims priority in accordance with 35 U.S.C. §119(e) to U.S. Provisional Patent Application Ser. No. 60/375,558 filed Apr. 25, 2002, included herein in its entirety by reference. The application is also related to U.S. patent application Ser. No. 10/106,852, filed Mar. 26, 2002.

FIELD OF THE INVENTION

The present invention relates to electronic conferencing and, more particularly, to a conferencing appliance that enables remote and local participants to connect to one another using disparate devices and for establishing and managing concurrent voice, data and video conferencing sessions initiated by one of more of such devices over heterogeneous networks.

BACKGROUND OF THE INVENTION

Discussion Of The Related Prior Art

Many conferencing technologies span such areas as voice conferencing, video teleconferencing, data collaboration and instant messaging. However, no systems deliver converged content (e.g., data and voice) accessed both as voice and data synchronously over multiple and heterogeneous networks using disparate devices which operate concurrently in an integrated manner.

There is an increasing demand in-the business community and elsewhere for a facility that allows interaction among geographically distributed participants in a manner similar to face to face interaction in a conference room setting. However, distributed participants may not have video conferencing equipment or a powerful desktop computer but rather a mobile phone and a personal digital assistant with intermittent wireless coverage. For that matter, the participant may be in a hotel room where using an Internet connection for all communication as this approach may be more economical than using a traditional telephone. To meet their basic conferencing needs of interacting with voice and data, the business community today relies on two separate conferences: one for data and one for voice, generally though not necessarily delivered from two separate vendors. One problem is that besides the economics and incompatible infrastructure, conferences are disjointed. Neither does the present conferencing strategy offer interactivity amongst the voice and data sessions. Additionally it does not span the gamut of device support and network coverage that is needed in today's market for the mobile work force. For video conferences, special infrastructure at all ends is generally needed and there is no provision for voice controls or interactivity with the data.

These problems are compounded with a rapidly growing mobile workforce and such disparity in communication technology where a wireless device may be incapable of operating over another's network and where voice, data, broadband and wireless networks are holistic and mutually exclusive. Therefore, there is a compelling need for a conferencing appliance that enables participants to connect using disparate devices over heterogeneous networks and which delivers a converged voice, data and video session in an integrated way. Beyond general integration of devices and networks, the appliance needs the capacity to control, manage and distribute merged and repurposed content to any device, over any network and in any media format for each participant within the context of the conferencing session. It is therefore an object of the present invention to provide conferencing interactivity among various conferencing participants using disparate devices working in concert, over different media streams such as voice, data and video.

Therefore, a need exists for an apparatus that enables participants to interact in a conferencing mode via a combination of media (e.g., voice, data and video) from a variety of devices (e.g., computer, wireless devices, mobile phones), from a variety of networks (e.g., PSTN, IP, Wireless, Cable and Broadband) from any global location. Furthermore, a need exists for a general purpose voice, data, video conferencing appliance delivering new conferencing capability and interactivity.

It is therefore an object of the present invention to provide a conferencing appliance that enables multiple users to connect to one another.

It is an additional object of the present invention to provide a conferencing appliance wherein one or more devices may be connected across multiple networks in a manner that all of a user's devices operate synchronously and concurrently.

It is a further object of the present invention to provide a conferencing appliance wherein users may participate in a multi-media (voice, data and video) converged conference.

It is yet another object of the present invention to provide a conferencing appliance supporting multiple network interfaces for connecting to a wide range of diverse devices.

It is a still further object of the present invention to provide a conferencing appliance wherein end users can participate in a rich-media (voice, data and video) conferencing session enabling users to talk, view video, exchange and share files, and collaborate data substantially simultaneously.

It is an additional object of the present invention to provide a conferencing appliance which provides support for next generation devices that are capable of delivering voice, data and video but which need to connect to such an appliance controls network connections and support concurrent delivery of voice, data and video within the context of a conferencing session.

It is also an object of the present invention to provide a conferencing appliance to optimize data shared during conference to ensure best viewing by each conference participant.

It is an additional object of the present invention to provide a conferencing appliance that transforms data by reformatting, repurposing and compressing files shared during the conference based upon parameters such as screen size, rendering capability, bandwidth and the network prior to delivering the data to a participant's display devices.

It is a further object of the present invention to provide a conferencing appliance wherein intelligent content transformation enables a range of disparate devices to be used for conferencing, even over low-bandwidth networks, thereby avoiding premature obsolescence of the devices.

It is a still further object of the present invention to provide a conferencing appliance to provide methods for establishing, managing and switching concurrent voice and data conferencing sessions for each participant over heterogeneous networks.

It is an additional object of the present invention to provide a conferencing appliance wherein dedicated channels for each device converge into a media interchange where, based upon user controls, voice and data can be simultaneously delivered to each participant depending upon application controls, device capability and device signature.

It is yet another object of the present invention to provide a conferencing appliance wherein conferencing data or conferencing commands are purposed in real time so that they can be accessed by each device for appropriate media delivery.

It is also an object of the present invention to provide a conferencing appliance, which enables switching of sessions among channels and devices based upon certain trigger events that can occur before or during conferencing.

It is an additional object of the present invention to provide a conferencing appliance that schedules a conference, controls a conference and sets up and tears down rich-media conferences using voice or data controls over one channel, while data or content is delivered over another channel.

SUMMARY OF THE INVENTION

In accordance with the present invention, there is provided a converged conferencing appliance capable of establishing and managing a multi-device concurrent voice, data and video conference by enabling multiple conference participants to connect from one or more devices concurrently over public switched telephone networks (PSTN), mobile networks, IP (Internet Protocol), wireless local or wide area networks, personal networks, and cable or fixed wireless networks (coax, fiber, hybrid fiber coax). The appliance has at least one vo9ice port and at least one data port. Each of the ports can be connected to an individual, respective device and all of the ports can be configured for simultaneous operation. In addition to the voice and data ports, at least one broadband port and at least one wireless port can be provided in the appliance. A mechanism is also provided to synchronize multi-modal communications and conferences among a number of users. Participants may connect and participate in an integrated voice, data and video conferencing session by connecting simultaneously from one or more diverse devices such that all devices of a participant operate concurrently and in concert. The combined effect of connecting from multiple devices enables a user to experience rich-media voice and data interactivity in a single conferencing session. This enables users to talk, view video and collaborate with data—all simultaneously and within the context of a single session operating over multiple devices, channels and networks. Users can participate in a conference from devices such as traditional phones, mobile phones, voice and data capable smart phones, computers, voice over IP devices, wireless devices (e.g., personal digital assistants, tablet personal computers, wireless notebook computers), next generation of voice and data capable and intelligent handheld devices including voice over IP devices, Bluetooth devices (e.g., Bluetooth enabled mobile phone, tablet PCs, notebook computers), infrared devices (handheld computers, overhead displays), broadband devices and residential gateways.

BRIEF DESCRIPTION OF THE DRAWINGS

A complete understanding of the present invention may be obtained by reference to the accompanying drawings, when considered in conjunction with the subsequent detailed description, in which:

FIG. 12 is a table of certain voice port protocols supported by the voice port of FIG. 11;

FIG. 23 is a block diagram depicting structure required to schedule a voice and data conference;

FIG. 29 is a table of certain functions used in a conferencing telephony dashboard.

DETAILED DESCRIPTION OF THE PREFERRED EMBODIMENT

Figure 1:
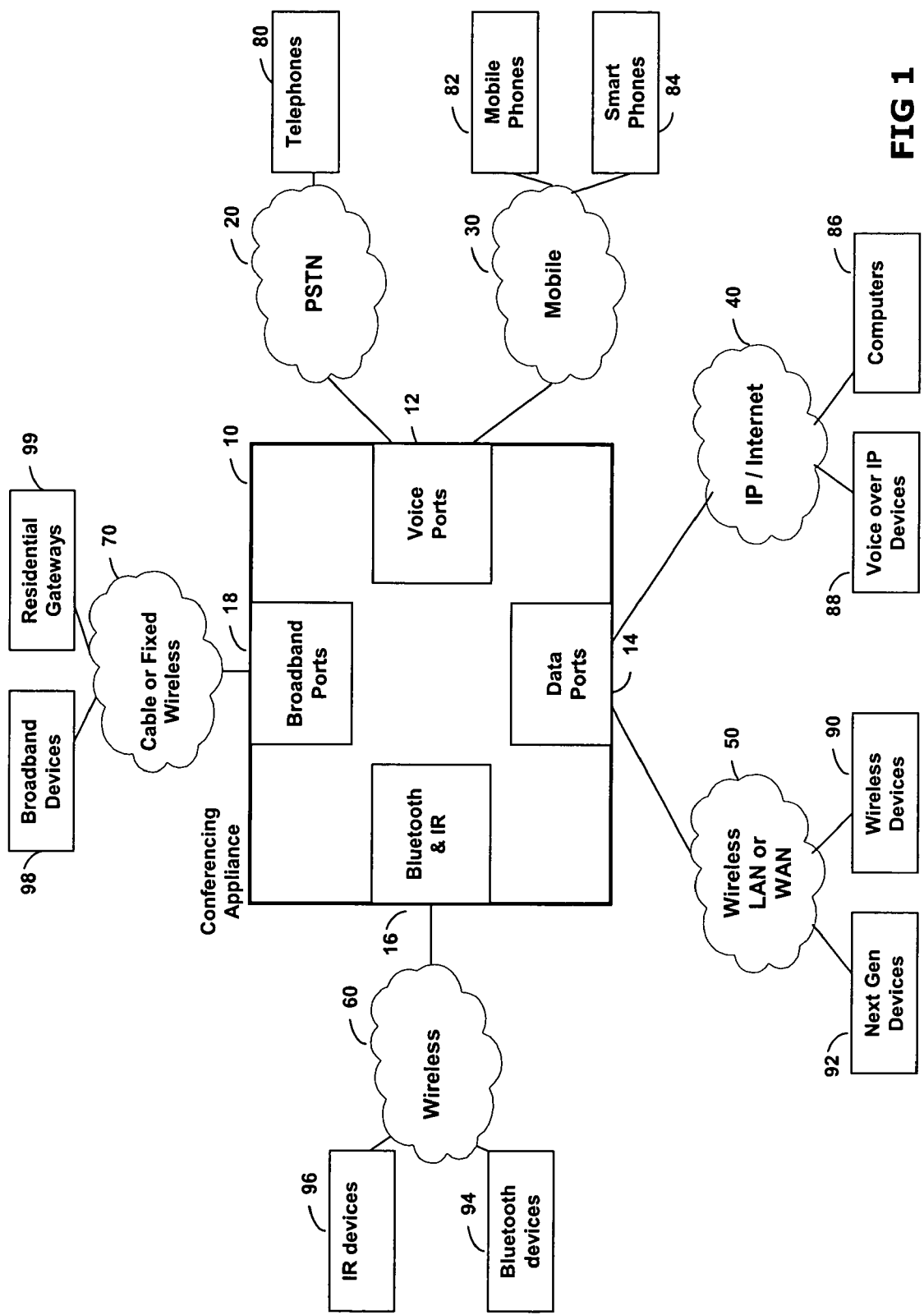
FIG. 1 is a system block diagram including the voice and data conferencing appliance of the present invention.

The present invention provides a conferencing appliance that allows participants to connect directly to the appliance through various means either locally or remotely through any network. Referring first to FIG. 1, there is shown a schematic block diagram of such a conferencing appliance 10 wherein a participant, not shown, may connect remotely from public switched telephony network (PSTN) 20, a mobile data network 30, an Internet Protocol (IP) based local area network (LAN) or wide area network (WAN) 40, a wireless LAN or WAN 50 and cable or fixed wireless networks 70. A participant may also connect locally to a device over personal wireless networks 60 such as those utilizing Bluetooth or infrared connection technologies.

Each of these networks supports a multitude of devices that a user may use to participate in a conference. Examples of these devices include a phone 80, mobile phone 82, smart phone 84, computer 86, voice over IP device 88, wireless devices such as pager and personal digital assistant 90, next generation wireless device 92, Bluetooth-equipped device 94, IR-enabled device 96, video equipment or other broadband device 98, residential gateway 99 and a host of other devices, not shown. The inventive conferencing appliance 10 may be extended to any suitable communications device, known or not yet invented, and the invention is not considered limited to the devices described-for purposes of disclosure. These devices can be used by participants to connect to the appliance 10 through any one or more of the available means to schedule a conference, join a conference or manage a conference.

Figure 2:
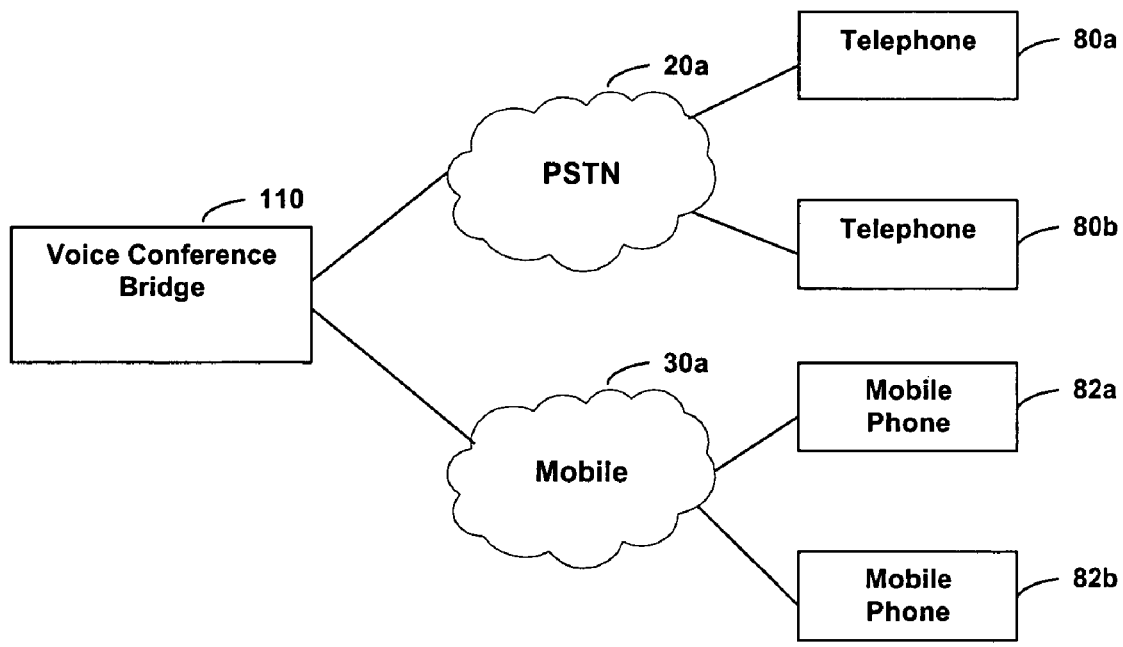
FIG. 2 is a schematic block diagram of a voice conferencing system of the prior art.

Referring to FIG. 2, a voice conferencing device 110 of the prior art enables voice conferencing amongst two or more participants, enabling them to use any traditional phone 80a, 80b and mobile phones 82a, 82b. Each user "dials" into a conference bridge using either a toll or toll-free number. Upon connecting, the user authenticates himself by entering a pre-set password and/or meeting number. Upon gaining access, the user can talk or listen "normally" and participate in a voice-only conference. The voice conferencing device 110 is not capable of enabling users to share data, nor is it capable of allowing the user to issue special commands through the voice circuits to control any other device capable of delivering data. Such devices operate within the PSTN networks and do not generally interoperate on IP, broadband, cable or fixed Wireless networks.

Figure 3:
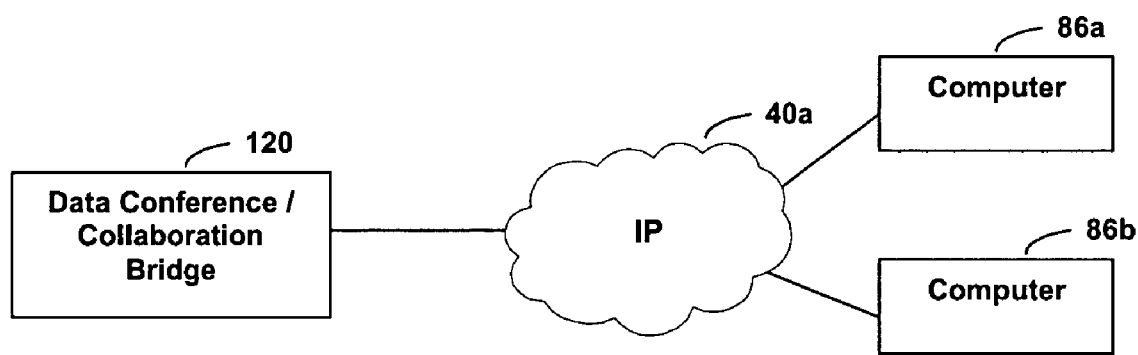
FIG. 3 is a schematic block diagram of a data collaboration and conferencing system of the prior art.

Referring to FIG. 3, a data collaborating device 120 of the prior art enables data-collaboration amongst two or more participants enabling them to use general purpose personal computers 86a, 86b with browsers or with other client software to collaborate and share data amongst themselves. Each user points to a universal record locator (URL) on the Internet from their browser, authenticates himself by entering a password and/or meeting number, thereby enabling him to share PowerPoint® presentations, Word® documents, or other files and even electronic white-board content. Such a prior art system enables data sharing in data-only mode with no controls for voice-conferencing. If the participants want to also "talk" while sharing data, the users have to connect via separate voice-conferencing service perhaps something similar to a voice conferencing bridge 110 (FIG. 2) as a separate unit. The voice-conferencing session and the data-collaboration sessions are mutually exclusive; there is no "connection" between the voice and data sessions. Also, this prior art system falls short in that it operates only on an IP network; it does not offer voice conferencing capability, and does not provide an integrated voice and data collaborative session.

Figure 4:
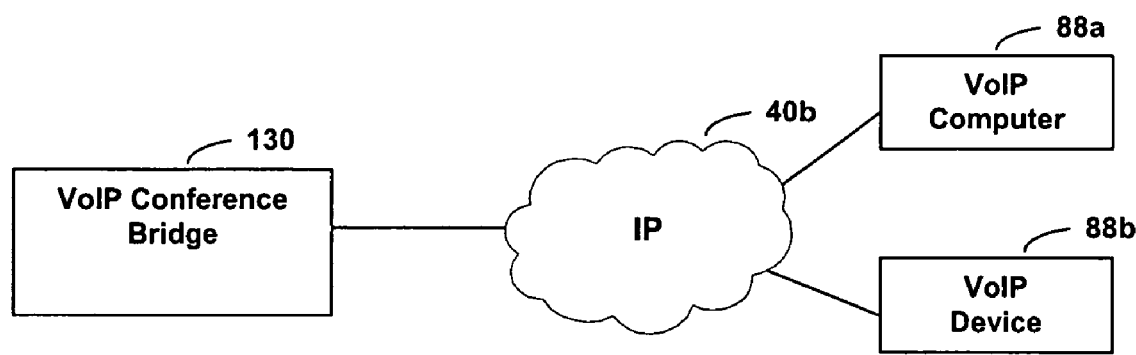
FIG. 4 is a schematic block diagram of a server based voice over IP system of the prior art.
Figure 5:
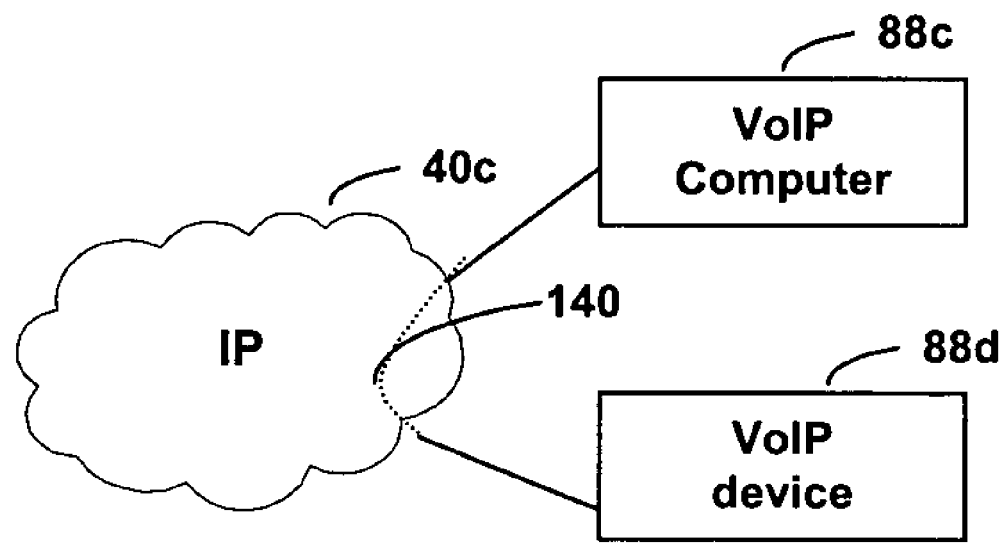
FIG. 5 is a schematic block diagram of a peer-to-peer voice over IP system of the prior art.

Referring to FIGS. 4 and 5, voice conferencing is enabled over IP networks of the prior art using so called voice over IP (VoIP) technology. Two or more computers or handheld devices, with voice over IP software installed as an application, can establish either a server-based voice over IP conferencing session 130 or a point-to-point 140 conference session such that participants can simply bypass the PSTN network by talking directly with or without microphones connected with various devices 88a-88d such as VoIP enabled computers, handhelds or VoIP devices. This prior art system can deliver voice as data but falls short of delivering data concurrently with the voice over IP session. Users cannot collaborate with files or invoke data deliver using VoIP commands. Also, the prior art method used with this system operates only over IP networks and not on the PSTN network.

Figure 6:
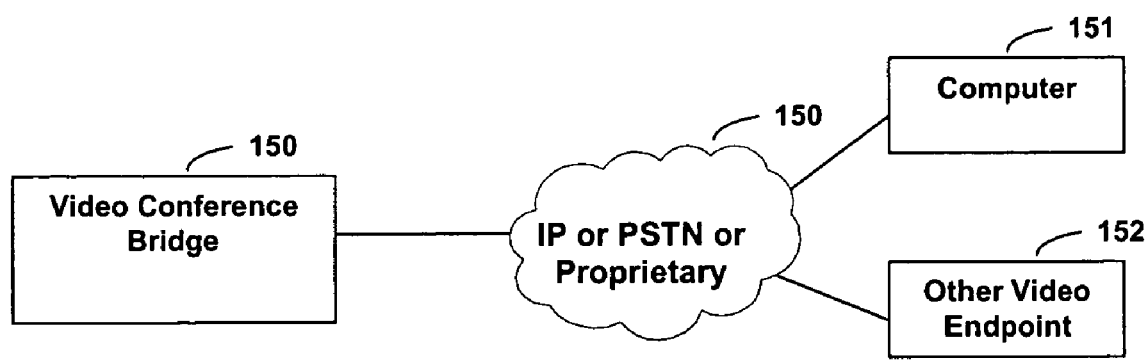
FIG. 6 is a schematic block diagram of a server based video conferencing system of the prior art.
Figure 7:
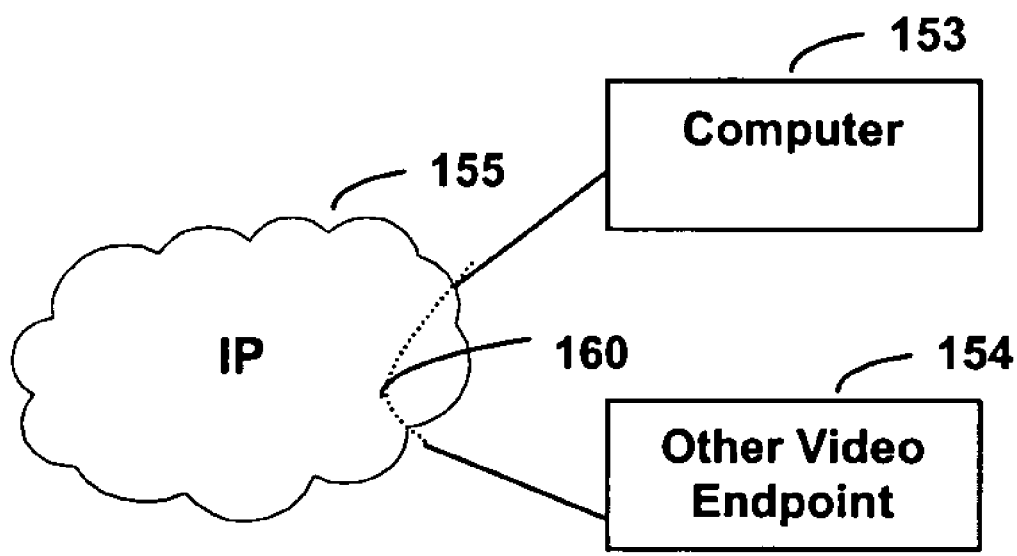
FIG. 7 is a schematic block diagram of a peer-to-peer server based video conferencing system of the prior art.

Referring to FIGS. 6 and 7, server-based 150 or point-to-point 160 videoconference of the prior art enables two or more participants (or group of participants) to "view" each other through a feed from local cameras mounted at each participating location with a computer with video application and equipment 151, 153 or proprietary video endpoint 152 or 154. Each video feed from a location is fed to other participating sites through a central server or through a point-to-point connection between endpoints and computers. Voice from each of these conference locations is also distributed and broadcast from each location to the others. Voice and video can be delivered over PSTN, IP, or proprietary network connections 156. However, these approaches cannot provide data collaboration so that data from a desktop can be shared for editing with the other users. They also lack converged voice and data controls enabling voice to control delivery or distribution of data. Additionally, they do not support wireless network and devices operating on those networks and generally require bulky equipment at each endpoint.

Figure 8:
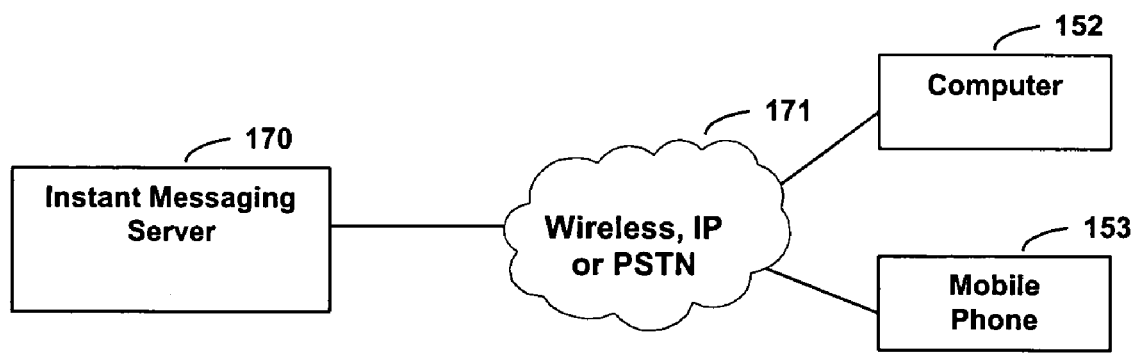
FIG. 8 is a schematic block diagram of an instant messaging system of the prior art.

Referring to FIG. 8, users connected via their local Internet Service Providers (ISPs) (e.g., AOL, MSN, Yahoo, etc.) or via their mobile carriers (e.g., Verizon Wireless, AT&T Wireless, Cingular, etc.) to instant messaging servers 170 can send and receive messages instantly to each other. For example, a user connected on the Internet can send an instant message from a computer 152 to a friend's mobile phone 153 so that a message is displayed on the screen of the friend's mobile phone 153. Alternatively, a user of a mobile phone 153 can send an instant "SMS" text message from his mobile phone 153 to another user's mobile phone, not shown. Messages (primarily text and images) can be sent from one user to another. This conventional system does not deliver conferencing capability as it simply enables messages of fixed length and size to be shared amongst participants without any voice capability or connectivity to broadband or cable networks.

Figure 9:
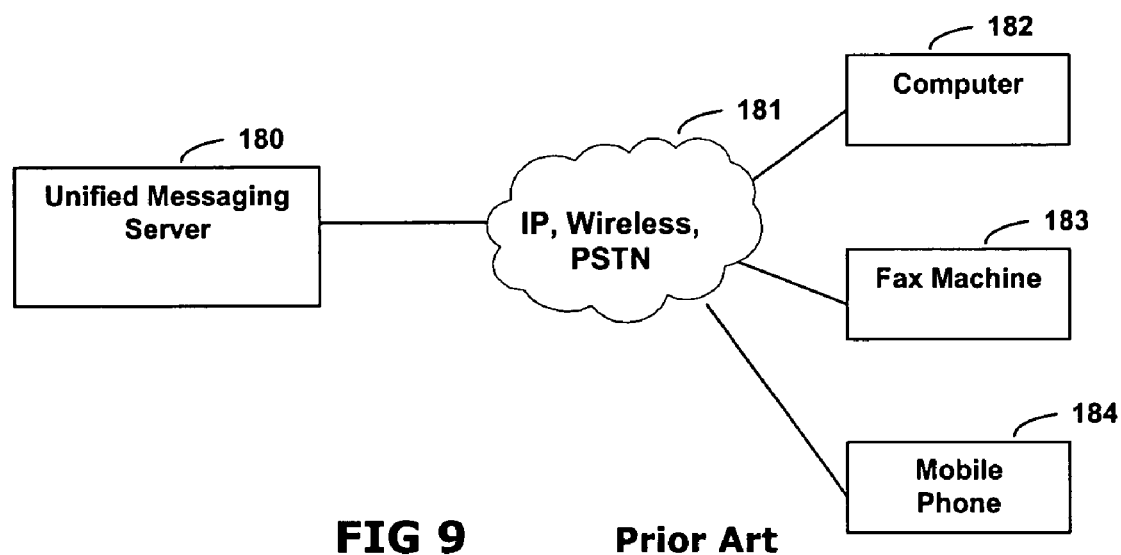
FIG. 9 is a schematic block diagram of a unified messaging system of the prior art.

Referring to FIG. 9, combining voice, fax, email and other message media such as SMS and Instant Messaging, into a single mailbox of the prior art allows the mailbox to be accessed by any web device (such as a browser or wireless PDA) or touchtone telephone. Emails or fax messages can also be forwarded, for example, to a nearby fax machine (e.g., at a hotel or at the airport). A user can also prioritize message delivery enabling him to receive messages from the boss or the spouse first, for example, before others in the inbox queue. A message in one media such as voice from a mobile phone 184 can be forwarded in another media such as email on a computer 182. A fax message can be forwarded from a fax machine 183 as an email on a computer 182. Conferencing capability, however, is not provided, nor can simultaneous delivery of voice and data between participants be effected. The system is limited to certain devices and message types.

Figure 10:
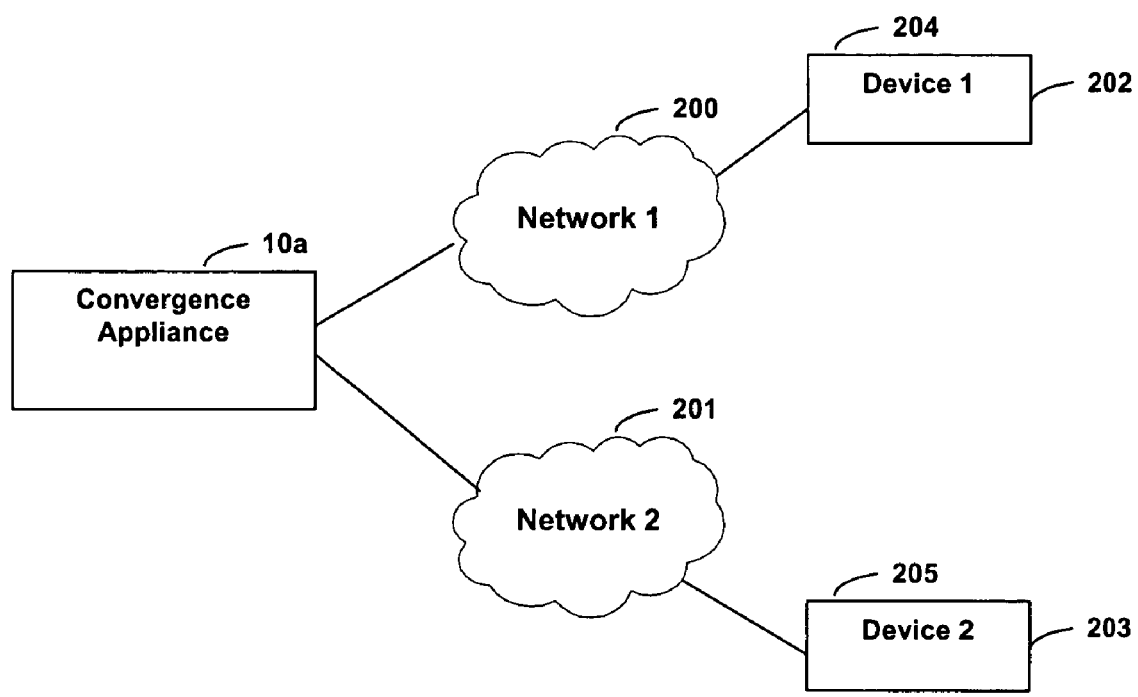
FIG. 10 is a schematic block diagram of a server based voice over IP system in accordance with the present invention.

Referring now to FIG. 10, there is shown a schematic block diagram of a converging appliance 10a of the present invention. It should be noted that reference numbers 10a, 10b, etc. are used hereinbelow to refer to portions of appliance 10 and do not describe devices other than appliance 10. Device 202 such as a phone connected over a network 200 such as the PSTN is capable of delivering a single media—such as voice 204. Another device 203 such as a wireless personal digital assistant, connected over another network 201 such as a wireless LAN may be capable of delivering a single media also—such as data 205.

Without convergence appliance 10a, device 202 and device 203 cannot: (a) operate together as a synchronous unit; (b) simultaneously deliver presentation content and instructions as a single unit; and (c) control delivery of content under instructions of one device 202 to the other device 203, for example. With the current embodiment of the convergence conferencing appliance 10a, however, as shown in FIG. 10, the two devices 202 and 203 can: (a) operate together as a synchronous unit; (b) simultaneously deliver presentation content and instructions as if the two devices 202 and 203 were a single unit; and (c) control delivery of content to one device 203 when instructed by the other device 202, for example.

Referring again to FIG. 1, the convergence conferencing appliance 10 has physical ports to connect it to various networks 20-70. To connect to the public telephone network 20 and traditional mobile phone network 30, connectivity is provided via different types of voice ports 12. To connect to data networks such as traditional IP 40 and wireless LAN or WAN 50, network connection capability is provided through various data ports 14. To connect to local Bluetooth devices 94 or IR enabled devices 96, the appliance 10 includes Bluetooth and IR capabilities with appropriate ports 16 for network connection. The broadband ports 18 connect to traditional coax, hybrid fiber coax or proprietary broadband devices.

Figure 1A:
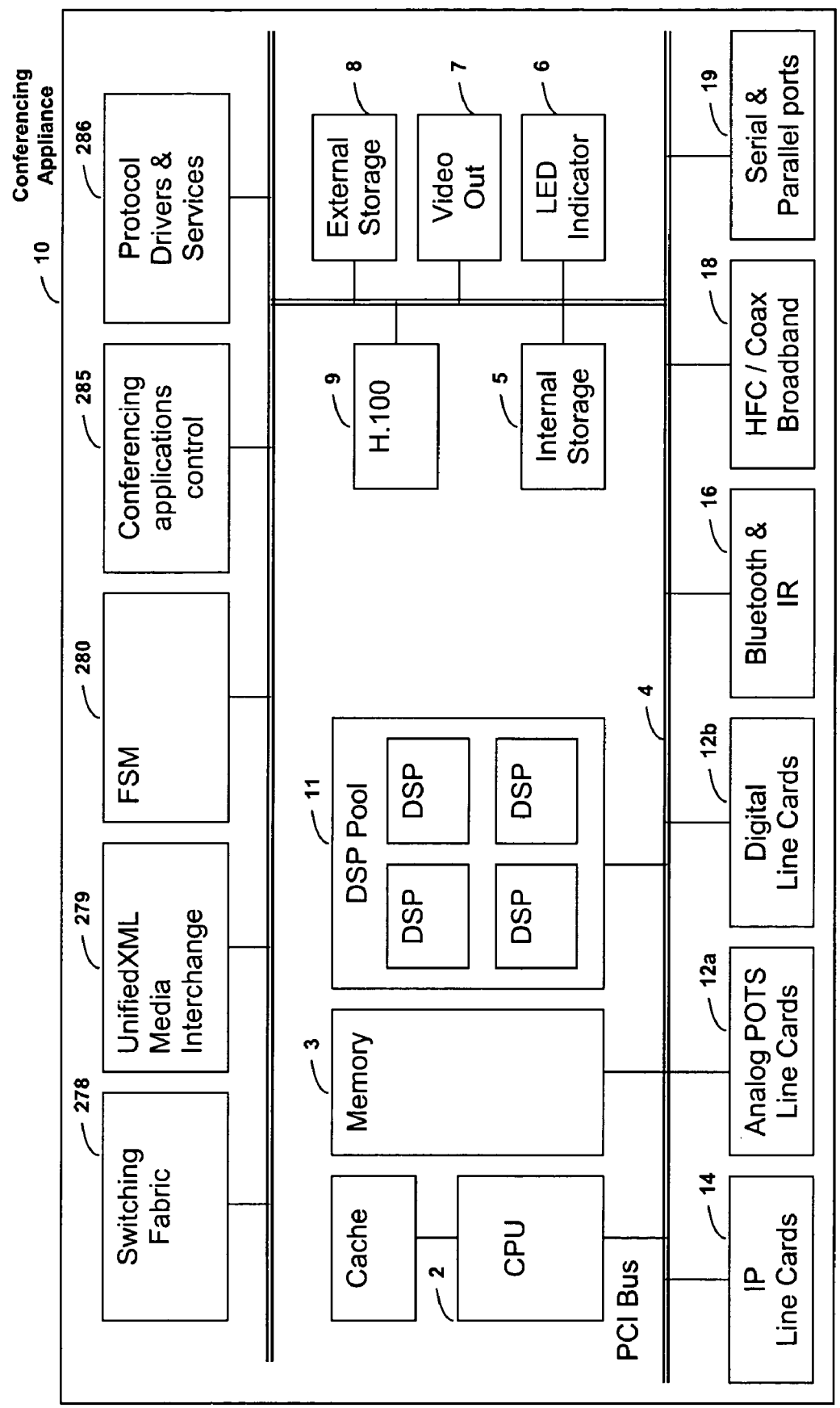
FIG. 1a is a schematic block diagram of the components residing in the appliance shown in FIG. 1.

FIG. 1a describes the physical components in the appliance 10. The appliance includes a CPU with internal cache 2, internal memory 3, PCI or cPCI bus 4, internal storage 5, LED indicators 6, video output 7, external read/writable storage 8 such as CD R/W or flash card, H.100 bus and connector 9. The H.100 interface enables trunk switching, addition of analog station interfaces, loop start line, subscriber loop, or direct inward dialing or any additional DSP resources that may be warranted. Various protocol interfaces can be used to connect the appliance 10.

Date devices with TCP/IP data port connectivity are connected through IP line cards 14. Devices capable of delivering voice are connected to the appliance 10 via either a public service telephone network or the wireless network. For both types of connections, the appliance 10 supports POTS phone connectors 12a and digital connectors 12b. For devices connecting to the appliance 10 via Bluetooth or infrared protocol, the appliance 10 provides Bluetooth and IR ports 16. The appliance can also support native video endpoints or connectivity to the hybrid fiber coax, coax and broadband network and devices through broadband port 18.

A pool of digital signal processing (DSP) resources 11 contains a number of individual DSP resources, each individually capable of being programmed to process messages from the line cards and ports. For instance, voice connection through circuit switch POTS port 12a may warrant an embedded announcement to be played, DTMF tone detection or generation, voice recording, playback or any other call processing capability. On the other hand, for CPU 2 to process such individual streams of media, the DSPs 11 can process the streams resulting in lower CPU utilization and higher level of concurrent usage and scalability. The appliance 10 includes switching fabric 278 to switch between users' device sessions, a UnifiedXML media interchange 279, embedded finite state machine 280 with conferencing application controls 285, and a set of protocol drivers and services 286.

Figure 11:
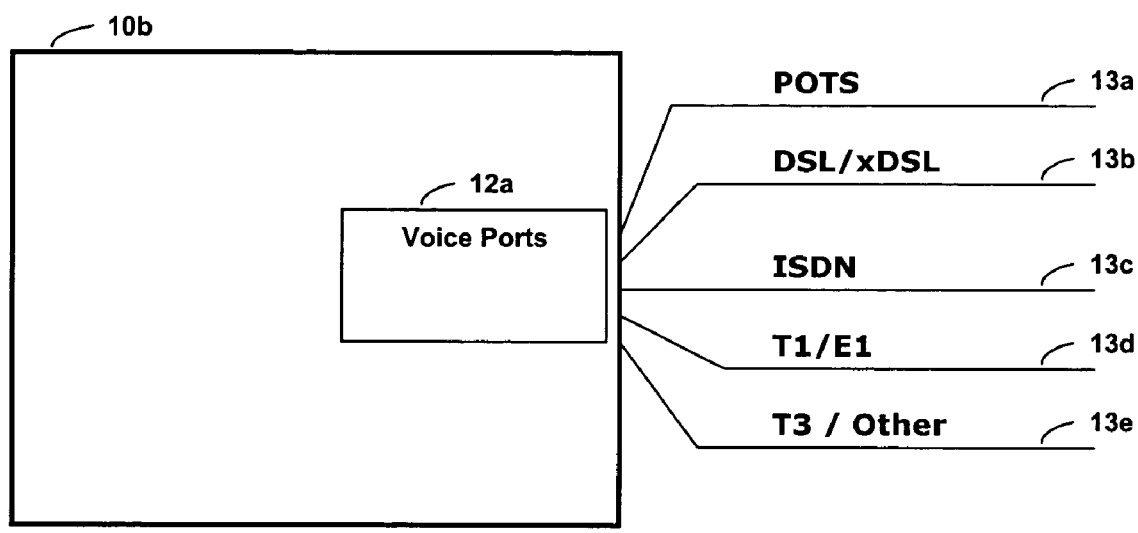
FIG. 11 is a schematic block diagram of a voice port portion of the convergence appliance of FIG. 1.

Referring to FIG. 11, the conferencing appliance 10b supports both analog and digital voice ports 12a. The appliance 10b offers connection capability to connect any standard analog "plain old telephone service" (POTS) trunk 13a, DSL/xDSL line 13b, ISDN line 13c, T1/E1 digital lines 13d, high capacity T3 line 13e or other standard interfaces. Each of the ports can be configured to support various trunk signaling protocols to enable the converged conferencing appliance 10b to be deployed in various countries utilizing different communications protocols. A trunk signaling protocol enables the appliance 10b to communicate with a specific public telephone and wireless network. For instance, trunk signaling protocol for loop start uses the presence or absence of current flow in the telephone circuit as the signaling information during call set-up and tear down processes. Usually for residential or small to medium sized organizations having between 8 and 16 analog trunks, local loop start signaling is pre-configured within the conferencing appliance 10b. An entry level appliance 10b can be pre-configured for an 8 port configuration with 4 physical ports on the conferencing appliance.

FIG. 12 depicts a list of signaling protocols supported by the voice ports 12a (FIG. 11) on the conferencing appliance 10b. The signaling protocols are Analog loop start, Australian P2 Protocol, European digital channel associated signaling protocols, Feature Group D protocol, ground start protocol, MF-socotel protocol, Multifrequency compelled protocols based on the R2 standard (MFC), NEC PBX protocol, Off-premise station protocol, Pulsed E and M protocols, SS5 (Signaling System #5), SS7, System R1.5 protocol, digital and analog wink start protocols and other protocols under development. It will be recognized that other signaling protocols could be developed and that converging appliance 10b could be configured to accommodate any new signaling protocol. Consequently, the invention is not considered limited to the known protocols chosen for purposes of disclosure.

Figure 13:
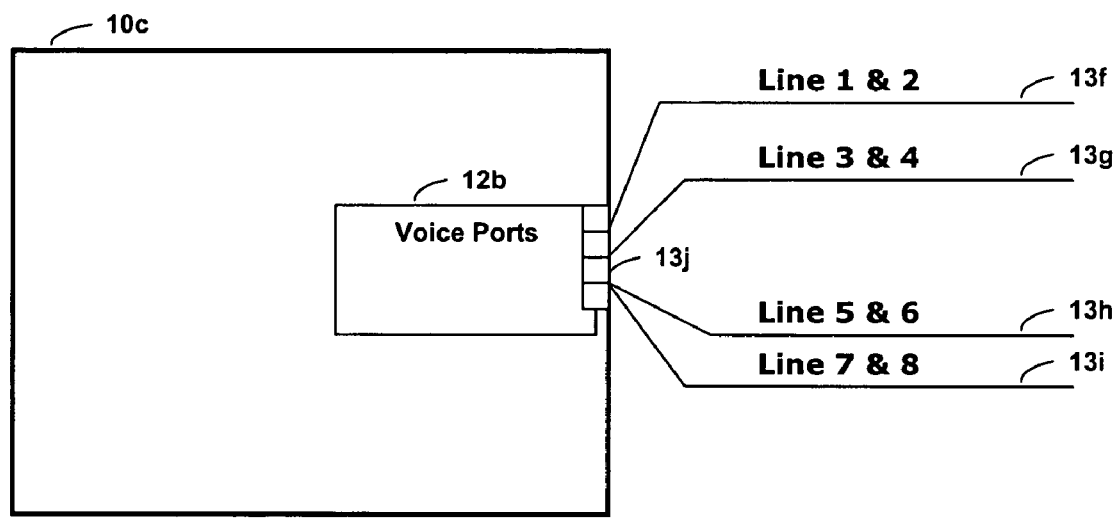
FIG. 13 is a schematic block diagram of an analog 8 voice port configuration of the convergence appliance of FIG. 1.
Figure 14:
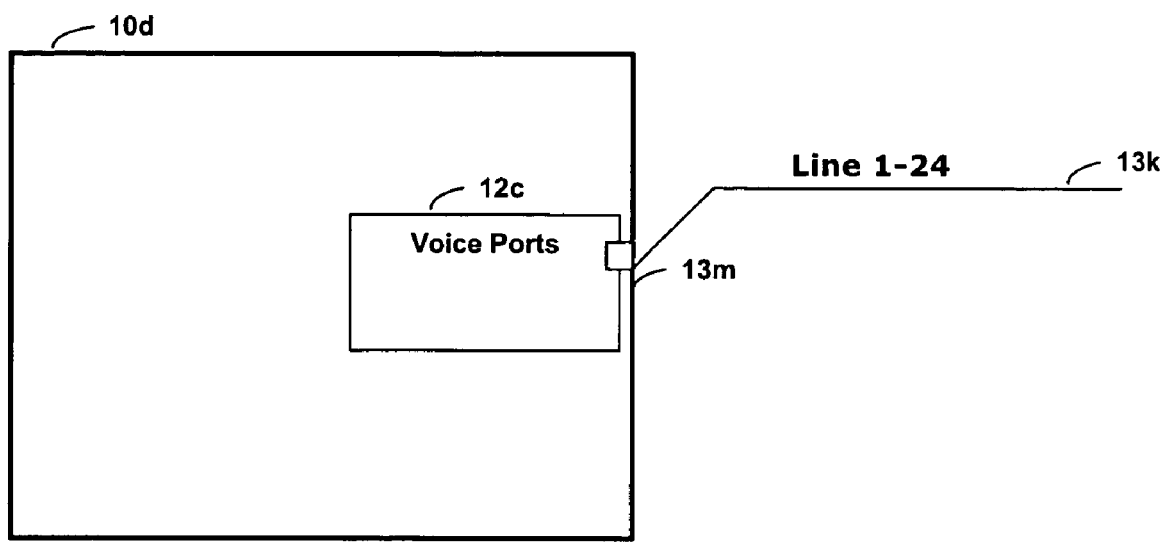
FIG. 14 is a schematic block diagram of a digital 24 port configuration of the convergence appliance of FIG. 1.

Referring to FIG. 13, there is shown a schematic block diagram of the voice ports portion 12b of converging appliance 10c. Eight POTS phone lines 13f-13i can be physically connected on the appliance 10c typically using four RJ12 ports 13j. Unlike analog trunks, the digital trunks multiplex the signals on many different channels into one physical interface or port. For example, referring now to FIG. 14, the conferencing appliance 10d can support up to 24 simultaneous telephone channels through the T1 trunk line 13k interface, enabling one physical port 13m to be used for 24 concurrent user channels.

Figure 15:
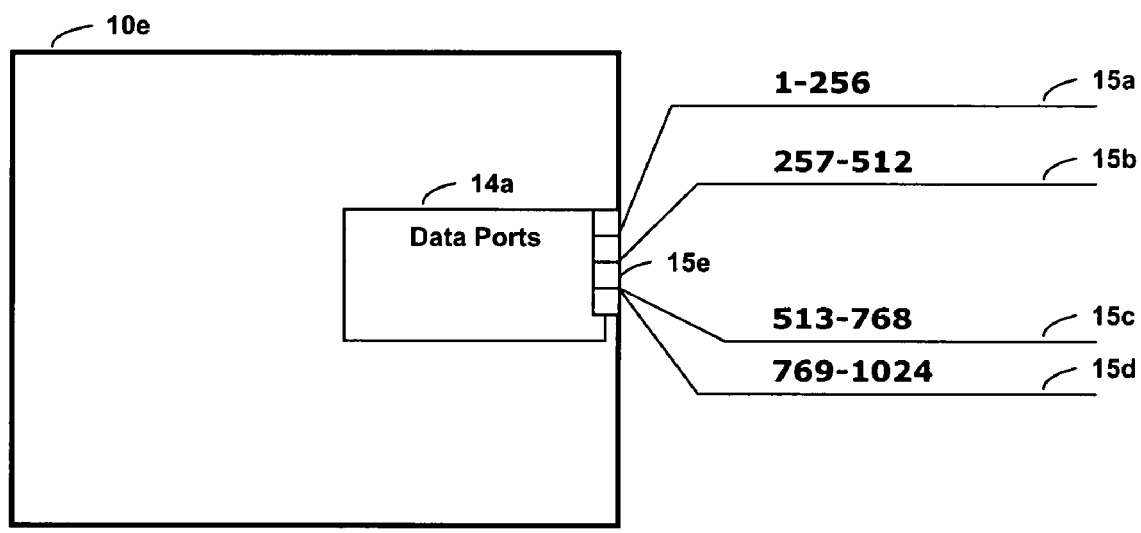
FIG. 15 is a schematic block diagram 4 data port configuration (10/100/1000 Mbps) of the convergence application of FIG. 1.

Referring to FIG. 15, there is shown a schematic block diagram of a data ports, portion 14a of converging appliance 10e. Appliance 10e supports data ports 14a that enable TCP/IP connectivity 15a-15d through two or more fully independent IEEE 802.3 (i.e., Ethernet) compliant ports 15e that support traditional 10 megabits per second (Mbps), 100 Mbps Fast Ethernet or 1000 Mbps Gigabit Ethernet protocols over unshielded twisted pair cables. This provides an aggregate 2 to 4 Gbps and higher system level interface. The data ports 14a support 10Base-T, 100Base-TX and 1000Base-T LAN protocols. The speed and mode of the TCP/IP connection can be selected either automatically via an auto-negotiation procedure or manually. The interface 15e on the appliance 10e works in multiple concurrent modes: Individual Stream based and Constant Flow based. Individual Stream based mode allows up to 256 streams of data per port enabling 256 participants 15a to concurrently join one or more conferences. Constant flow based mode allows up to 32,000 traffic flows enabling thousands of concurrent users. In either case, each TCP/IP port can be assigned many different IP addresses.

Referring again to FIG. 1, the converging appliance 10 provides data ports 14 for participants to collaborate, access, retrieve and share presentation data by enabling them to connect via traditional computers 86 through a private LAN/WAN connection 50 or via the public Internet 40. Data ports 14 also enable participants to engage in voice conferencing using voice over IP (VoIP) devices 88. VoIP connections enable participants to use any standard computer 86 or VoIP device 88 such as a phone to participate in a conference. Typically, mobile executives may avoid paying high telephone rates from hotel rooms as they can bypass the hotel and telephone companies by connecting through VoIP computers 86 and devices 88 through an ordinary modem or a T1line. Although connecting from a computer, the users actually interact by voice. The program on the computer 86 or the VoIP device 88 transforms voice into data (VoIP) when sending it to the conferencing appliance 10 and retransforms it into voice on the return. A footprint of the VoIP capability is also embedded in the conferencing appliance 10.

The data ports 14 provided by the appliance 10 also allow participants to connect over wireless networks 50 using wireless devices 90 such as personal digital assistants and next generation of devices 92 such as smartphones. These wireless devices 90, 92 can be connected over a wireless LAN 50 such as IEEE 802.11a, 802.11b or 802.11g networks or a wireless WAN 50 such as GPRS. Either way, participants can come in from wireless networks and participate in a voice and data conferencing session.

Figure 16:
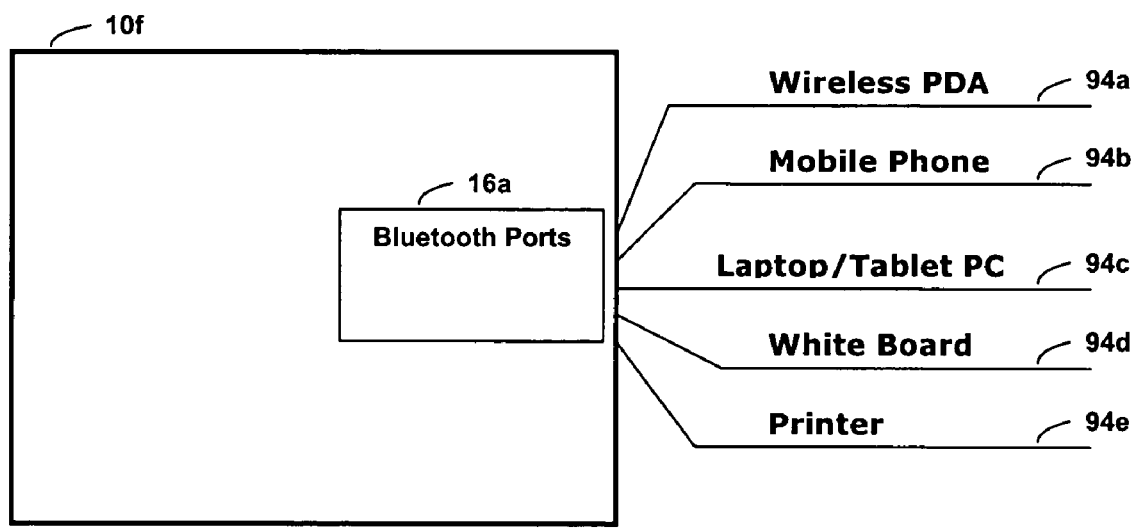
FIG. 16 is a schematic block diagram of Bluetooth ports of the convergence application of FIG. 1.

Referring to FIG. 16, there is shown a schematic block diagram of a Bluetooth ports 16*a* portion of converging appliance 10*f*. Bluetooth is a wireless packet radio networking technology designed for a very short range (roughly 30 feet), well known to those of skill in the art. Bluetooth technology was originated by Swedish mobile phone maker Ericsson, and is designed to interconnect up to eight devices located close to one another. By implementing the Bluetooth stack, the conferencing appliance 10*f* supports a short range network called Personal Area Network (PAN) or piconet. One or more participants in a conference room can concurrently share and access presentation related files such as agenda or presentation material by wirelessly connecting their wireless personal digital assistants 94*a*, mobile phones 94*b*, laptop or tablet PCs 94*c*, electronic white boards 94*d*, printer 94*e* or other devices with the Bluetooth enabled conferencing appliance 10*f*. PSM security is built into the appliance 10*f* enabling multiple participants to share personal calendars, data and files. Protocols such as L2CAP, RFCOMM, BNEP and others are supported by the Bluetooth stack in the appliance 10*f*.

Referring again to FIG. 1, a variation of the conferencing appliance 10 also provides broadband connectivity in two ways. First, directly through physical broadband ports 18 supporting cable, HFC and fixed wireless networks on the backplanes, and secondly, through the data ports 14. Either way, third party broadband devices 98 with various endpoints and residential gateways 99 can be directly connected to the conferencing appliance 10.

Figure 17:
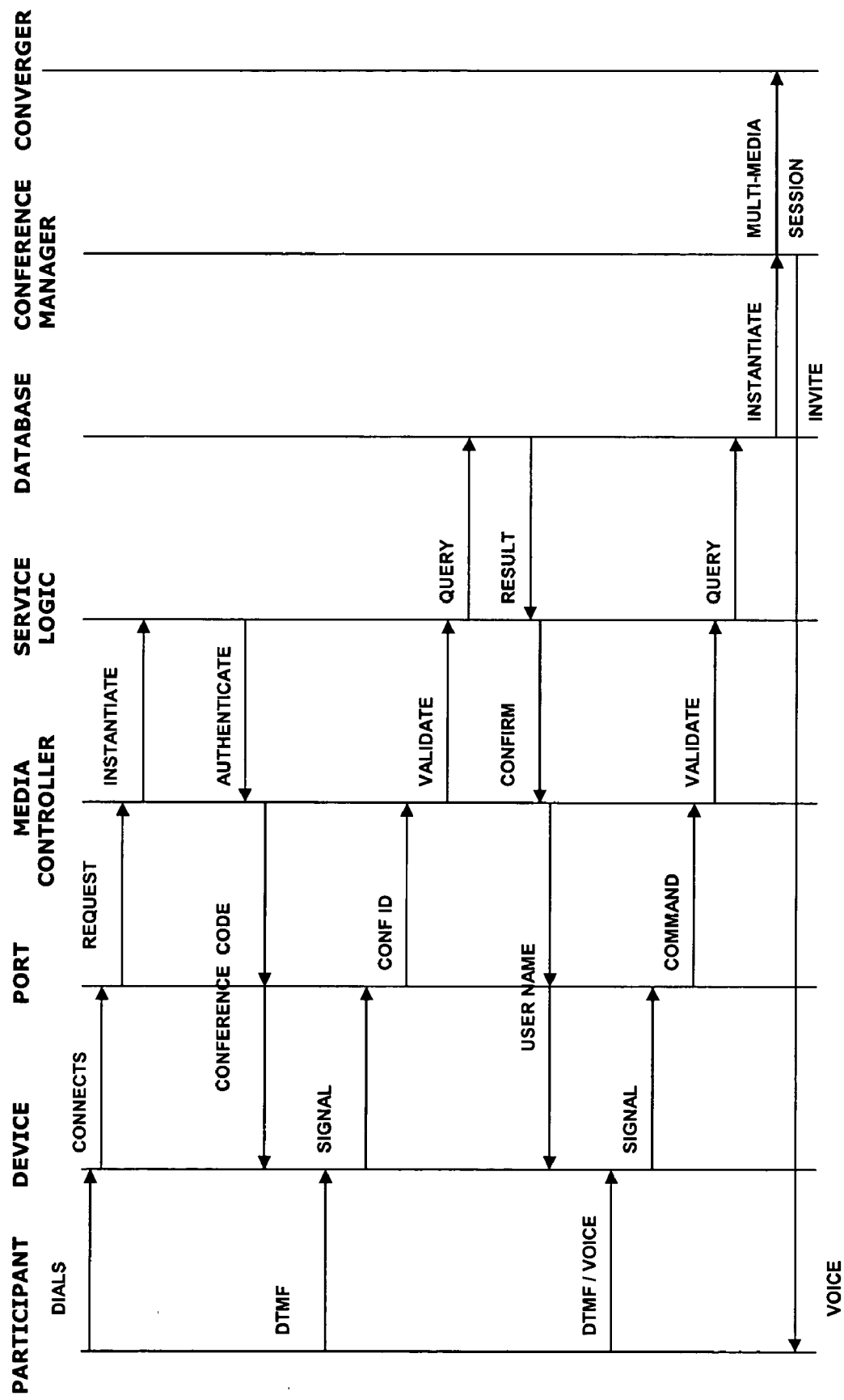
FIG. 17 is a flow chart/timing diagram depiction of voice conferencing session initiation.
Figure 18:
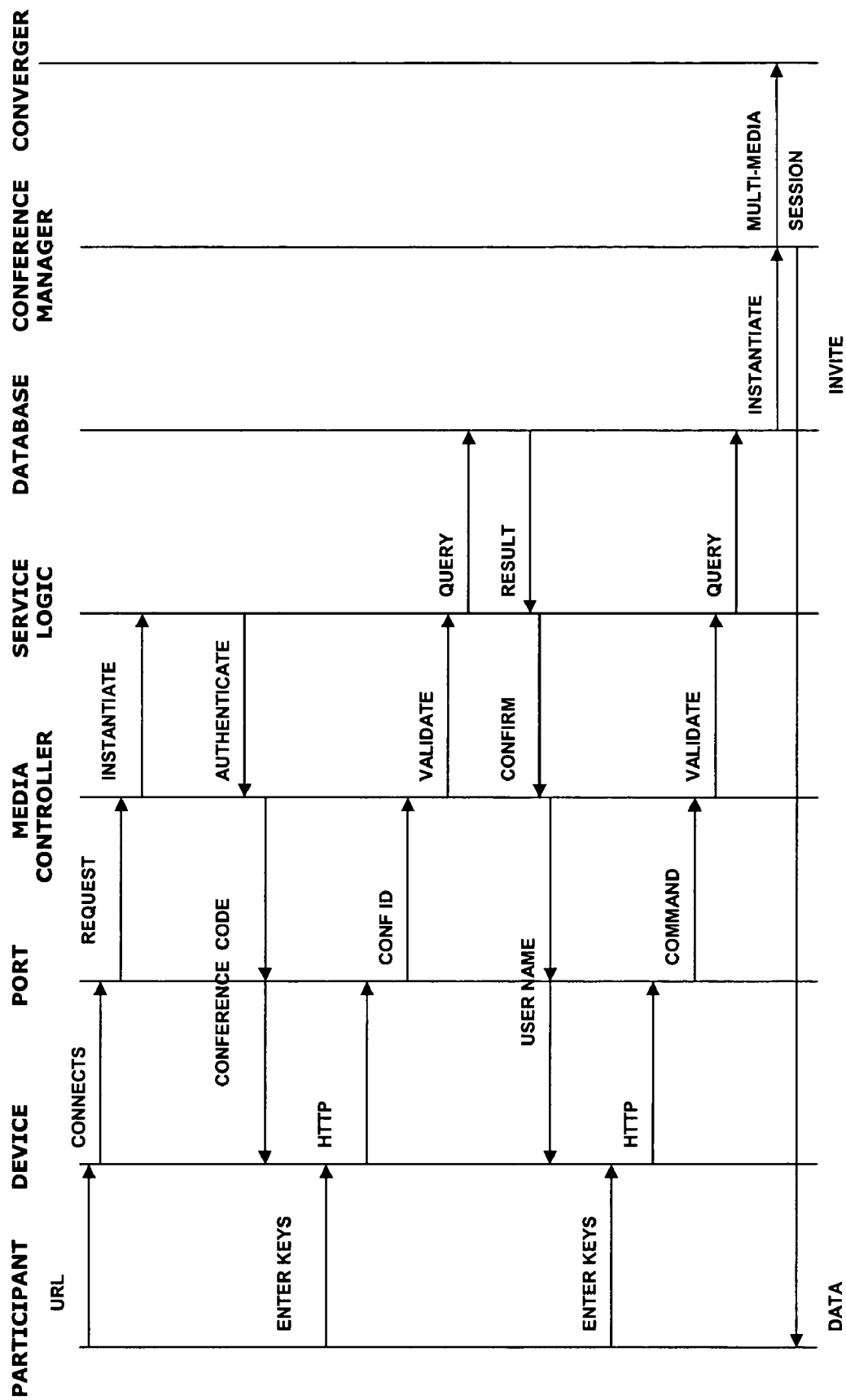
FIG. 18 is a flow chart/timing diagram depiction of data conferencing session initiation.
Figure 19:
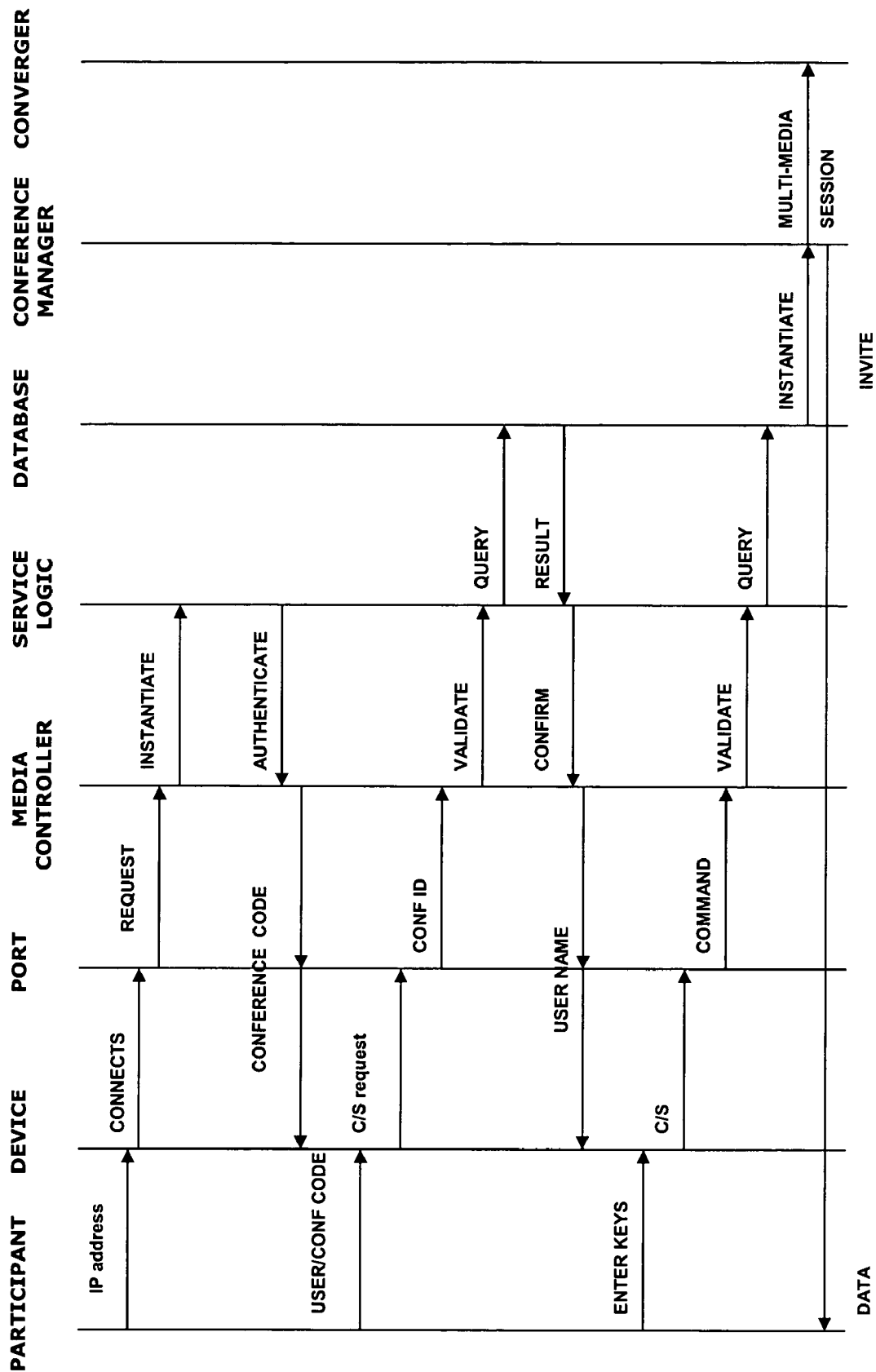
FIG. 19 is a flow chart/timing diagram depiction of voice over IP conferencing session initiation.

Procedures to Connect Devices:

Still referring to FIG. 1, each of the devices 80-99 is capable of delivering voice, data or voice over IP at any one time. The procedure to connect from all the voice devices is same irrespective of whether the network is wireless 60 or PSTN 20. FIG. 17 is a chart showing a voice conferencing initiation sequence. Similarly the procedure to connect from all data devices is consistent and is independent of the network, as shown in FIG. 18. Finally each VoIP device 88 may be connected in one or two ways depending upon its capability as shown in FIG. 19.

The appliance 10 provides not only the network connections, but also the embedded application logic to process the incoming device connections. It consolidates multiple connections from each user within the-auspices of a single user session.

A Multi-Device Multi-Channel Session Initiation

Figure 22:
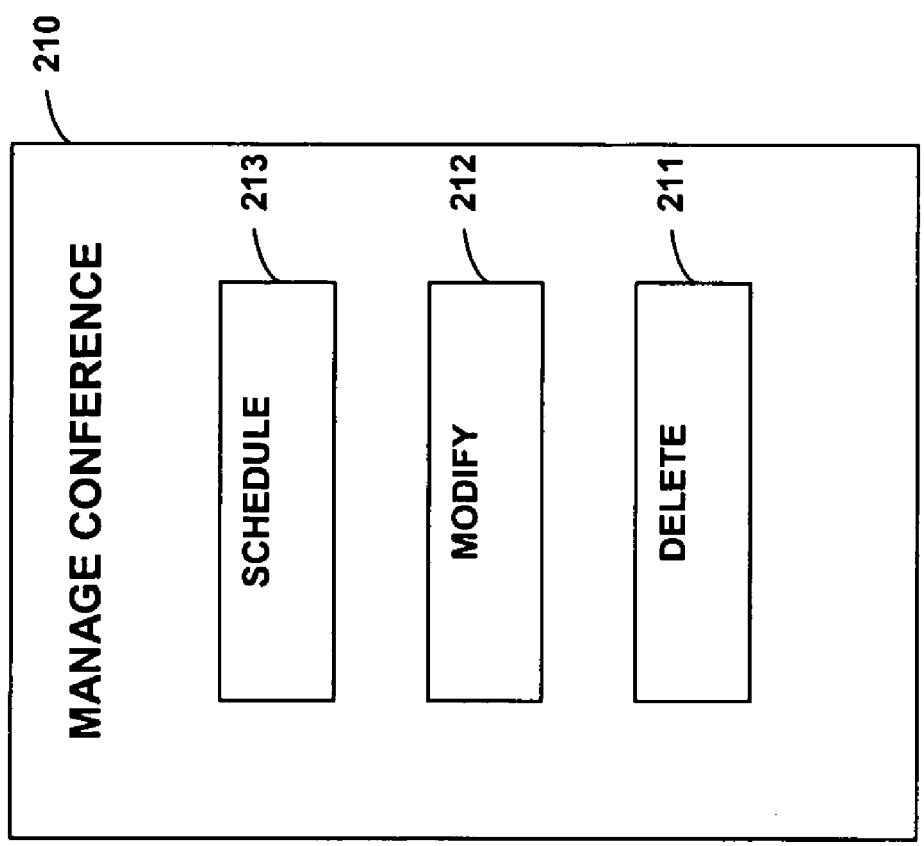
FIG. 22 is a block diagram depicting structure required to manage a voice and data conference.

Scheduling a Converged Conference:

Prior to describing the initiation of a multi-device conferencing session, it is more appropriate to describe how such a conference is created. FIG. 22 illustrates one such mechanism. A moderator or a conference host, not shown, logs securely into the appliance with a web browser. Upon logging in, the host clicks the "Manage conference" hyperlink or icon, leading the conference host to a "Manage Conference," reference numeral 210. The host also has options to delete 211 a conference, modify 212 a conference or schedule a new conference 213.

The host clicks the "Schedule" button or a hyperlink 213 to go to the schedule conference 215, shown in FIG. 23. On the Schedule Conference page 215, the host can schedule a new conference by selecting a number of participants by clicking the "Participants" icon or hyperlink 216, schedule a time when the conference starts 217, define the Mode as Voice, Data, Video or All 218, Upload files for sharing 219, Enable notifications 220 to be sent to all participants assuming that they have enabled the notification flag, and send a personal email 221 informing participants of the scheduled conference. A status window 222 updates the status of the scheduled conference. If the conference is scheduled for Mode=Voice and Data then the conference allows all participants to connect via their phones as well as log in through a data window to share and collaborate data and files.

Figure 24:
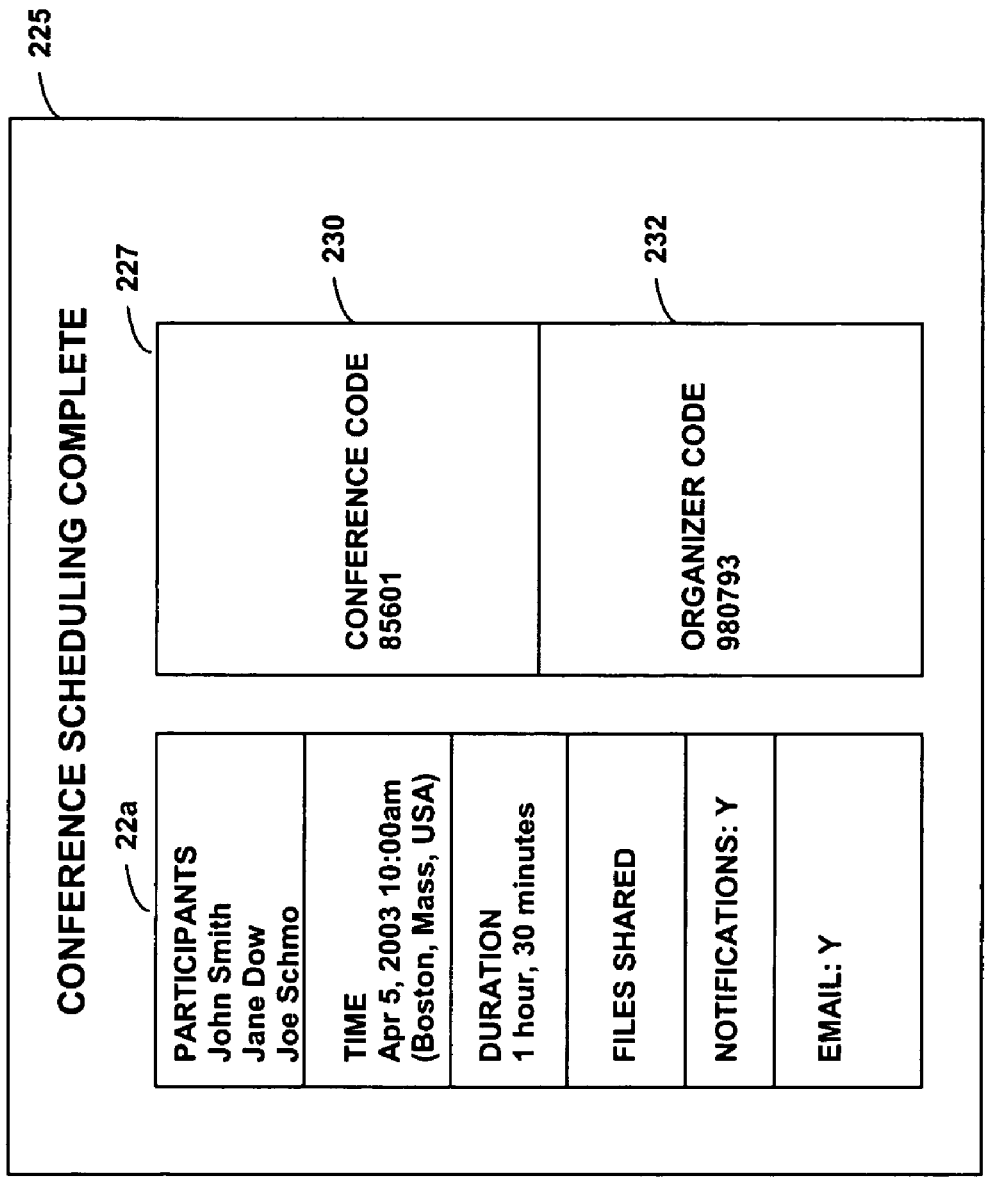
FIG. 24 is a block diagram depicting conference code and organizer code.

Upon completing all the attributes for scheduling a conference, the host submits the schedule to the appliance 10. The appliance 10 validates the data, checks for any schedule conflict and eventually returns with a "Conference Schedule Complete," page 225 as shown in FIG. 24. This page 225 shows the machine generated "Conference Code" 230 and an "Organizer's Code" 232. These codes are unique for the conference. Each participant eventually connects from multiple devices via voice and data using the same Conference Code, making the connection process simple for all users. The record of the conference is stored in a database on the appliance 10 (FIG. 1). The conference record is accessed in real time when a user connects to the appliance 10 from any device 80-99.

Figure 25:
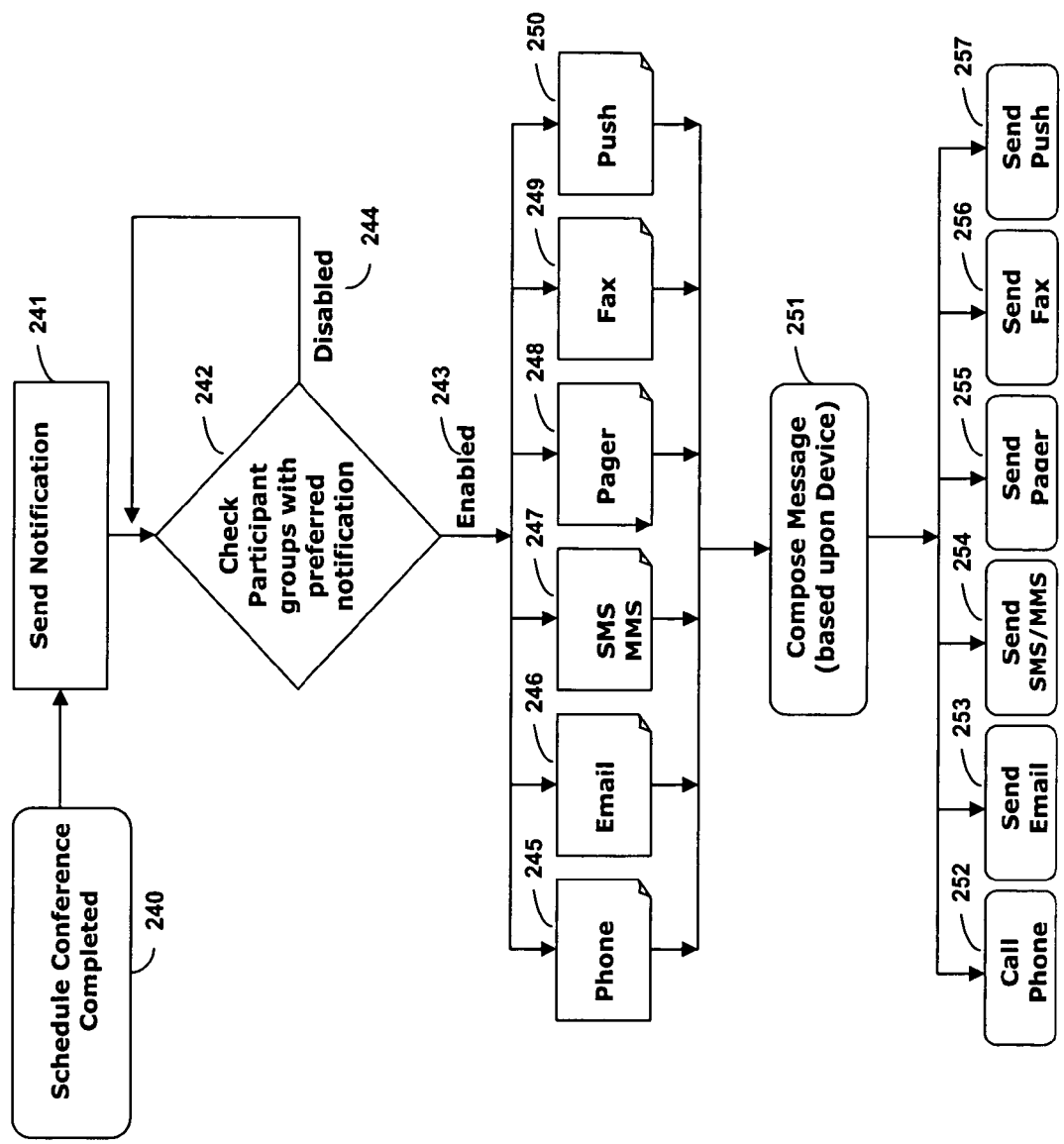
FIG. 25 is a flow diagram of multi-media conferencing notification.

Sending Conference Notifications:

After a conference has been scheduled, each participant is notified about the conference through a preferred notification method of their choice. Referring to FIG. 25, after the conference has been scheduled, step 240, the "send notification" process is invoked that sends voice or data notifications and alerts, step 241. For each conference that is just scheduled, all of the participants are grouped, based upon their preferred methods of notification, step 242. If the user has disabled one's notification, step 244, that user is ignored and control moves on to the next notification mode. For participants who have enabled their primary notification, step 243, the notification process checks the user's choice. It can be phone 245, email 246, SMS/MMS 247, pager 248, fax 249 or push 250. Each of the messages warrants custom message composition, step 251. For example, although an email message can be of unlimited length, an SMS message is 80 to 128 characters depending upon the carrier. Once a message is composed, the user is informed through his phone, step 252, email, step 253, SMS/MMS, step 254, pager, step 255, fax, step 256 or push mechanism, step 257.

Session Initiation from Devices:

A user may initiate a multi-channel, multi-device session with either a voice device or a data device. It is possible that a participant may join the conference through data, immediately before the voice conference is to start. Alternatively, a participant may join the conference through a phone followed by the data side later. The following describes a process of connecting from a phone 80, 82 or 84, a wireless personal digital assistant 90, 92, 94 or 96, and a Voice over IP device 88. Typically a user may connect from any voice device, and any data device one after the other. A VoIP session may be connected as opposed to a phone for the voice session.

Step 1: Initiating a Voice Conferencing Session Independent of the Data Session:

The procedure to connect from a voice device (phone, mobile phone) to invoke a conferencing session is illustrated in FIG. 17. A participant initiates the conference call from his mobile or PSTN phone by dialing the telephone number of the conferencing appliance, step 400. The phone number terminates at one of the voice ports of the Conferencing appliance, step 402. The request is received by the media controller, step 404. The media controller in the appliance initiates a voice session and delivers the command and requests the application logic for further instructions, step 406. The service logic tells the media controller to seek application specific authentication—the conference code, which was generated during scheduling a new conference. The media controller, cognizant of the device's signature and media, requests the participant to authenticate, step 408 and enter the conference number, step 410. The user enters the four digit conference code, step 412, using the keypad on the phone, sent to the port, step 414, the DTMF signal being detected by the port, step 416 and sent to the media controller for the service logic to process, step 416. The service logic validates the conference code, step 418, by querying the database, step 420. Upon validation it instantiates the conference and allows the user to participate in the conference, step 422, and confirms the command, step 424. If the service logic concludes that the conference is a multi-channel voice and data conference then the media controller instructs the user to enter, for example, the first four digits of his last name, step 426. Should there be a conflict in the last name, the user may have to enter his first name as well. If the conference was voice and data enabled, the converger is notified that the conference warrants a multi-media concurrent voice and data session. The converger remains on standby until the user connects from a data device. A similar process is executed by the user to authenticate the login ID (name) which, upon validation results in instantiation of the multi-media conferencing session, step 428-436. The user is then invited to participate in the conference call, steps 438-442.

Step 2: Initiating a Data Conferencing Session Independent of the Voice Session:

The procedure to connect from a data device (wireless PDA, web browser, PC, etc.) to invoke a conferencing session is illustrated in FIG. 18. A participant initiates the data conferencing by entering a URL on the browser on a personal computer or on a wireless device, step 450. The URL translates into an IP address of the port of the conference appliance, step 454. The appliance takes the request as an HTTP request and instantiates the application logic to process the transaction, step 456. The server sends a page for user authentication. The user enters the conference code that was generated during conference scheduling by the host and the username through one or more pages, step 462. If the parameters are correct, the server logic instantiates a collaborative session for the user. The context of the session is stored in the database. The database records are updated in a ConfInProgress table which is part of the conferencing database schema. If the user had already logged in through the phone, his record is updated to reflect the timestamp of the login from a data window. If the user logs in for the first time, a new record is created in the ConfInProgress table. If the conference that this user is about to participate in was scheduled as a voice and data collaborative conference, then the conference manager informs the converger to stay awake for another session from the user. Should the user already be connected from the voice and data devices, the converger manages user context and user session of the conference in a multimedia format.

Step 3: Initiating a Voice Over IP Session Independent of the Other Sessions:

A participant armed with a VoIP enabled computer or a wireless personal digital assistant can invoke a VoIP session with the convergence conferencing appliance and participate in a conference with other participants who may be using PSTN phones, mobile phones, VoIP phones or similar VoIP enabled computers and devices. To invoke a VoIP session with the appliance, as illustrated in FIG. 19, a user opens up an application on his device and enters the IP address or phone number of the server, step 480. The client software connects with the IP address of the appliance on one of the data ports, step 482. The port sends the request to a VoIP server application running as a service on the appliance, step 484. The request is delivered to the media controller that requests an instance of the user session by interacting with the service logic, step 486. The service logic grants the connection and forwards an authenticate request initiating a request from the user to authenticate himself along with the conference in which the user desires to participate, step 488. The user enters the username and conference code data, step 490, and submits the request, step 492. The response is submitted as a client/server request, step 494. The media controller translates media requests to logical data requests for the service logic, steps 496,498. The service logic queries the database and retrieves the results of the parameters in order to qualify the authentication request, step 500. If the user is invalid, the user may reenter some of the information. Upon successful validation, step 502, a user's session is deemed verified, step 504. In a similar way, the user's login in authenticated, step 506-514. A Voice over IP channel is opened and interaction with the user is purely voice. If the active conference also supports data, the convergence manager advises the converger to stay awake for another potential session from the participant, steps 516-520.

Step 4: Multiple Sessions and Devices:

Through a method of registration that can be performed any time prior to the connection process, each user can pre-register his device(s) as follows. All participants scheduled for a conference must be registered users. There are two mechanisms by which a user can be registered: (a) the conference administrator is responsible for creating a user registration, and (b) a user may self register himself, assuming that the administrator has enabled this option. Also, ad hoc participants and guests can participate in a conference through guest logins.

Figure 26:
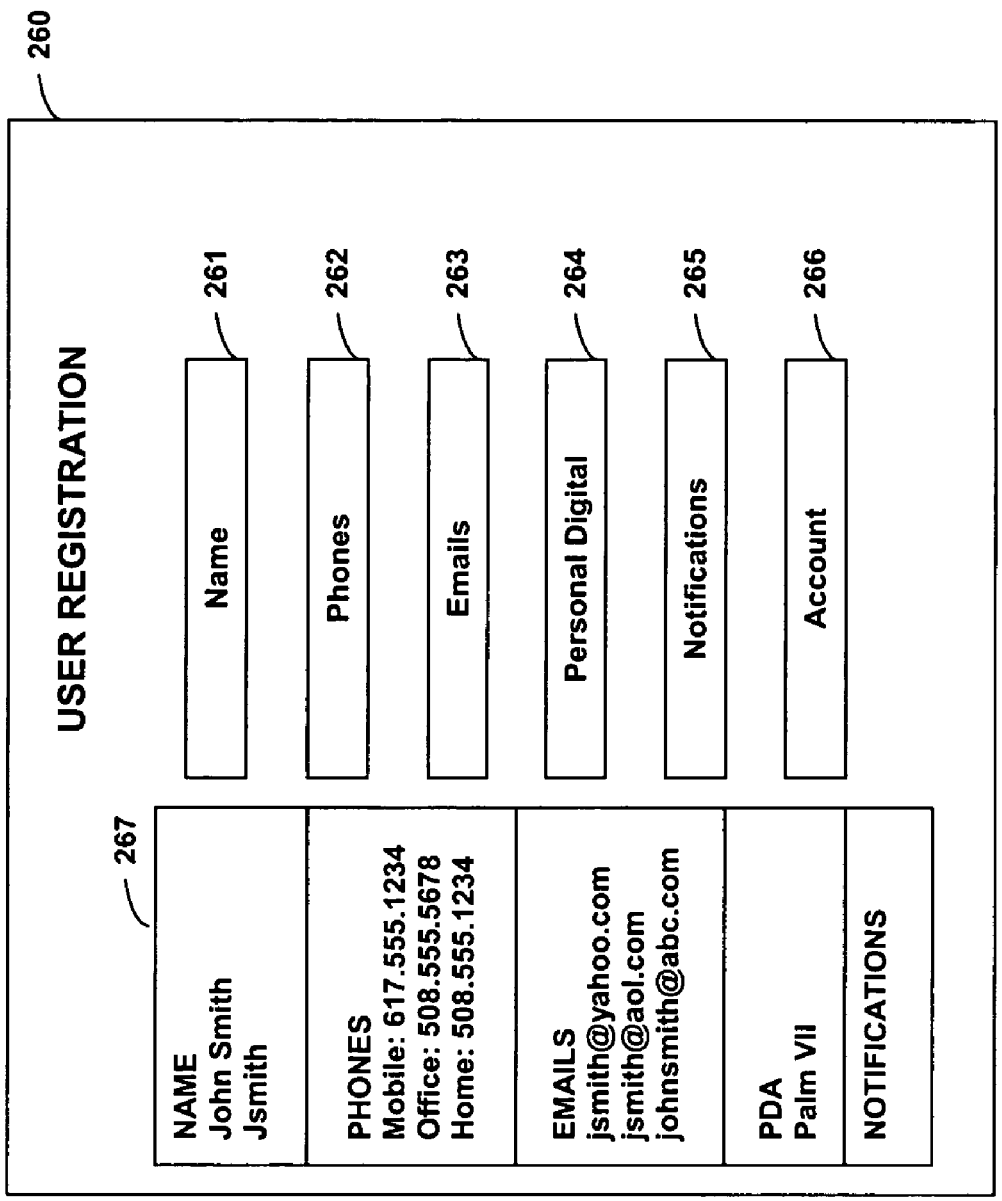
FIG. 26 is a block diagram depicting user registration.

Referring to FIG. 26, each participant creates his own personal profile from the user registration screen 260 and enters information such as name/password 261, phone 262, email address 263, personal digital assistant information 264, primary notification method 264, account information 266 and other similar personal information. Once registered, the participant is available to be scheduled in a conference by others, assuming they have access privileges to schedule this participant. The process of user registration is provisioned from a web browser and the database is stored in the appliance 10. This pre-registration process "informs" the appliance 10 of the various devices that a user can use. During this registration process, the appliance 10 collects and stores information such as phone number and service provider of the user's mobile phone while other dynamic device addresses are retrieved from the device when the device connects to the appliance. The latter is generally true with endpoint or IP addresses when a computer or a wireless handheld device is connected to an IP network, a wireless local area network or a mobile IP network uses Dynamic Host Control Protocol, 802.11x or Mobile IP protocols, respectively. By knowing the endpoint or IP address or, for instance, the phone number, the appliance 10 can appropriately distribute data or voice content to each particular device or channel. By knowing the device type, the content is reformatted in a particular media and delivered in a single media, (i.e. voice, data or video).

Content can also be delivered on multiple channels and devices being used by a user simultaneously. This enables the appliance to allow each participant, for instance using a mobile phone, to participate in a conference and enables a user not only to talk but also to use special commands available on the touch-tone pad of a phone to initiate email delivery to his computer or issue whisper commands to request data or communicate with a subset of the participants. A participant using a mobile phone can invoke these commands from the phone's keypad. However, a participant's ability to invoke such commands is controlled by the status and context of the conference and the user's privileges. The appliance therefore delivers the controls for only appropriate commands to a user through a touch-tone keypad not only based upon a user's authorization profile, but also based upon the context of the conference.

To achieve real time device awareness, the appliance 10 keeps track of all the devices from which each participant has previously connected. The appliance 10 constantly updates its awareness of each user's device connection through polling or presence or the like. This enables the appliance 10 to be sensitive to scenarios in which where a device such as a wireless personal digital assistant looses connectivity when a mobile user leaves the wireless coverage area.

Figure 20:
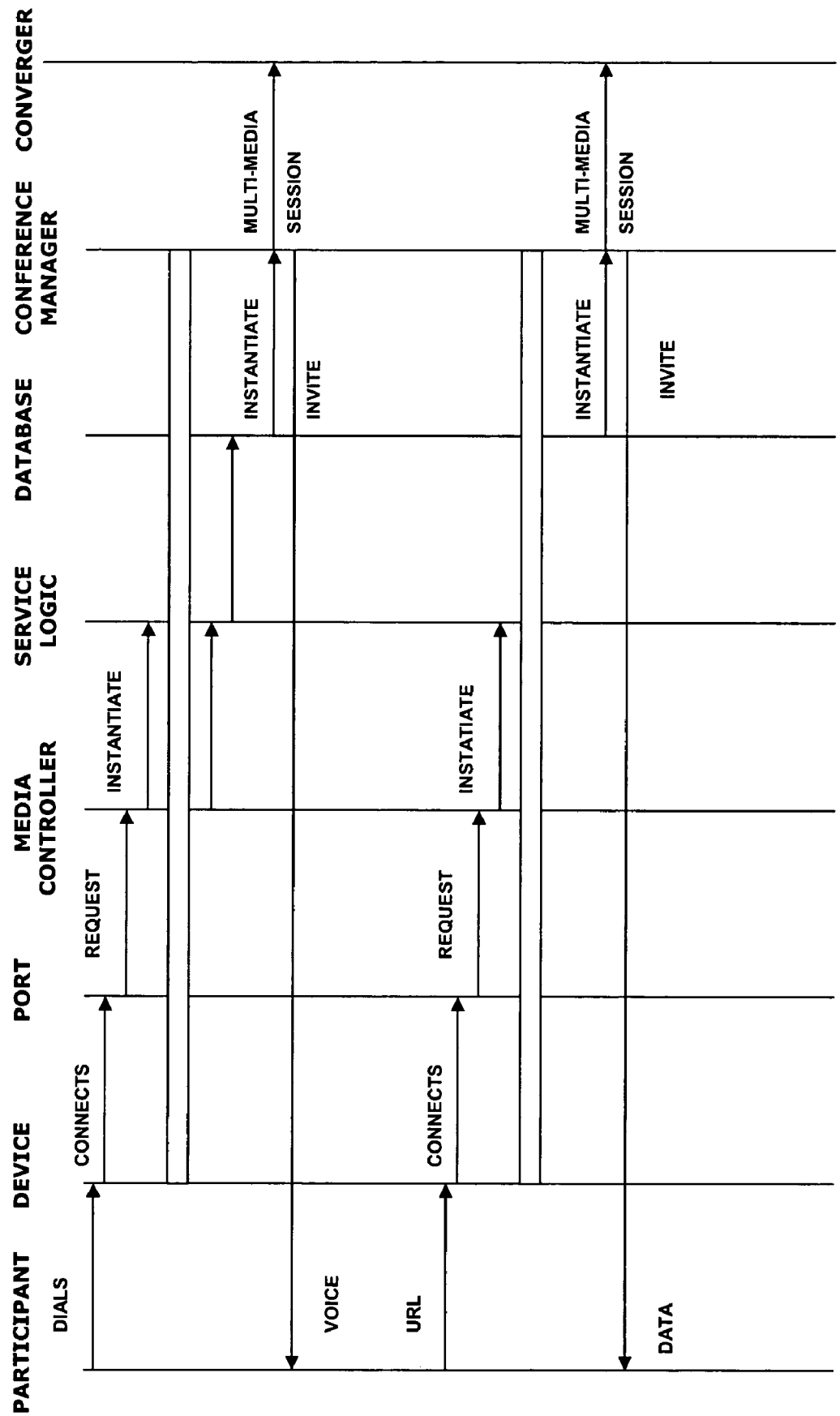
FIG. 20 is a flow chart/timing diagram depiction of voice and data converged conferencing session initiation.
Figure 21:
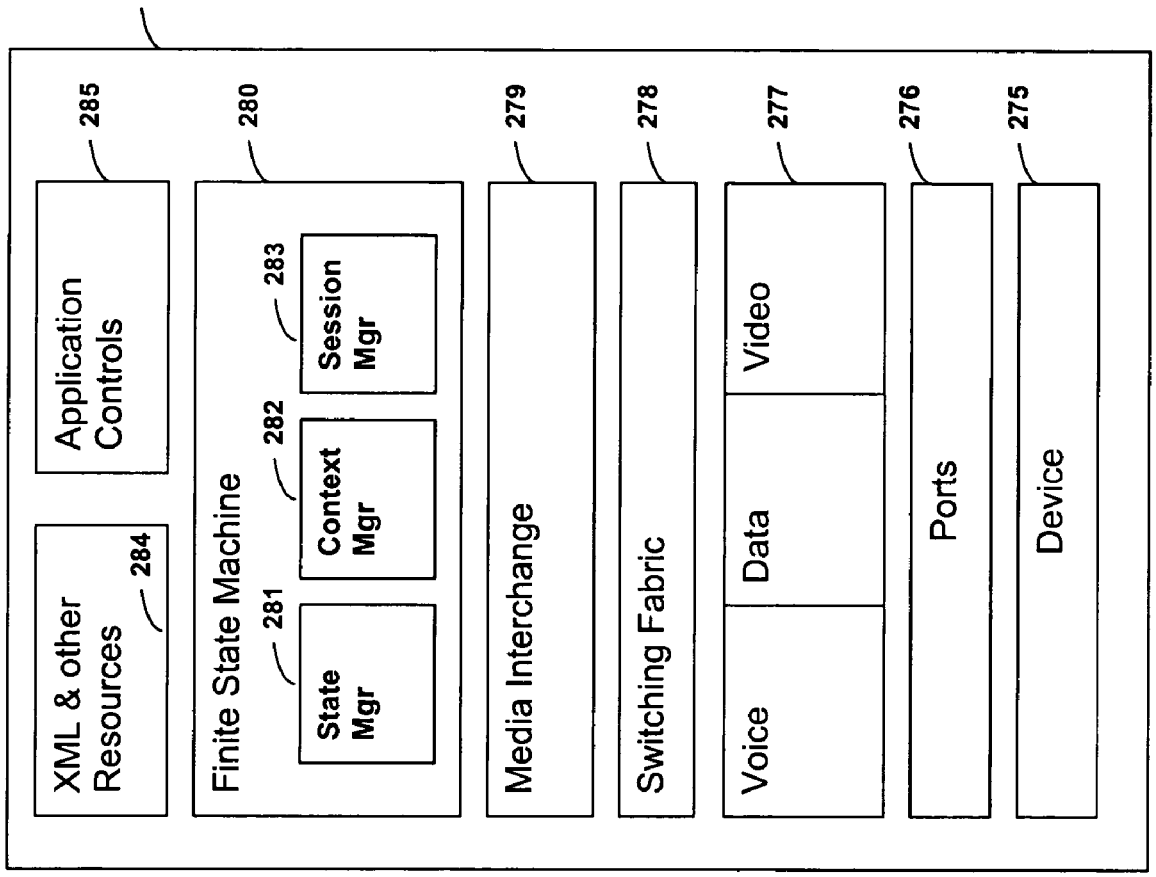
FIG. 21 is a block diagram of the conference convergence engine of the invention.

FIG. 20 illustrates a converged voice and data session in which a user connects first through the phone followed by the browser. The voice session is established followed by the data session, the detailed steps of which have been provided with reference to FIGS. 17-19 hereinabove. FIG. 21 illustrates a block diagram of the components of the conference convergence engine 274 and its operation. The engine 274 interacts with the conference manager and appliance ports 276 to deliver converged content. The converger supports three media streams and media types: Voice, Data and Video 277. Switching fabric 278 is responsible for switching between voice, data and video streams. It is a combination of hardware and software and allows for the switching paths amongst these ports to be controlled. The switching fabric 278 is a high-speed, non-blocking and switched serial packet network that allows for asynchronous operation. Although internal to the converger, it interacts with CompactPCI Packet Switching Backplane (cPSB) standard that is developed by the PCI Industrial Computer Manufacturer Group and few emerging standards such as one developed by Intel. The standard architecture considers each cPCI board as a standalone processing node or blade that communicates via Ethernet with other boards at speeds of 1 GB and higher. Multiple Voice and Data ports can therefore be "invoked" with converger switching fabric 278.

The converger switching fabric 278 interacting with finite state machine 280 determines the port on a specific card for data exchange (both inbound and outbound). A typical chassis configuration, not shown, can support 16 such voice and data cards that can be operated by the converger switching fabric 278. Each chassis can also be extended over the TCP/IP packet network to other chassis via TCP/IP cable to create an "extended" backplane.

The media interchange 279 is an interchange of different media streams that the switching fabric 278 interacts with. A voice stream in XML (e.g., VoiceXML) may have to be transformed into a data stream (e.g., WML or HTML). The interchange is responsible for converting or repurposing the content in real time and delivering it to the switching fabric 278 for transmission through an appropriate port. The interchange converts the voiceXML into WML or HTML. The conversion can be completely dynamic or may be pre-defined by the conferencing application. The media interchange interacts with the intelligence of the conferencing application by interacting with the finite state machine 280.

The finite state machine 280 stores the various states of the conferencing application and is instantiated for all participants. It includes a state manager 281, a context manager 282 and a session manager 283. Each attendee in a conference is instantiated a state, context and session. Interactivity with an attendee is a function of the state, context and session manager components. The state manager 281 manages the state of the current conference. A state, for example, could be "login" when the user logs in, a "telephony interface" (TI) command when the user issues a computer telephony command, etc.

The context manager 282 manages the context of the user session. For example, a user may simply issue a "mute" command from the browser resulting in a predefined set of attendees to be muted. The muting of the pre-defined set of attendees was made possible due to the context inherited into the new state. The muting of the set of attendees was a consequence of the pre-defined session context.

The finite state machine 280 interacts with the application controls 285 and accesses XML and other resources 284 for delivery to the media interchange. A request from one device over one media (e.g., voice) may result in results over another media (e.g., data) over another device.

Figure 27:
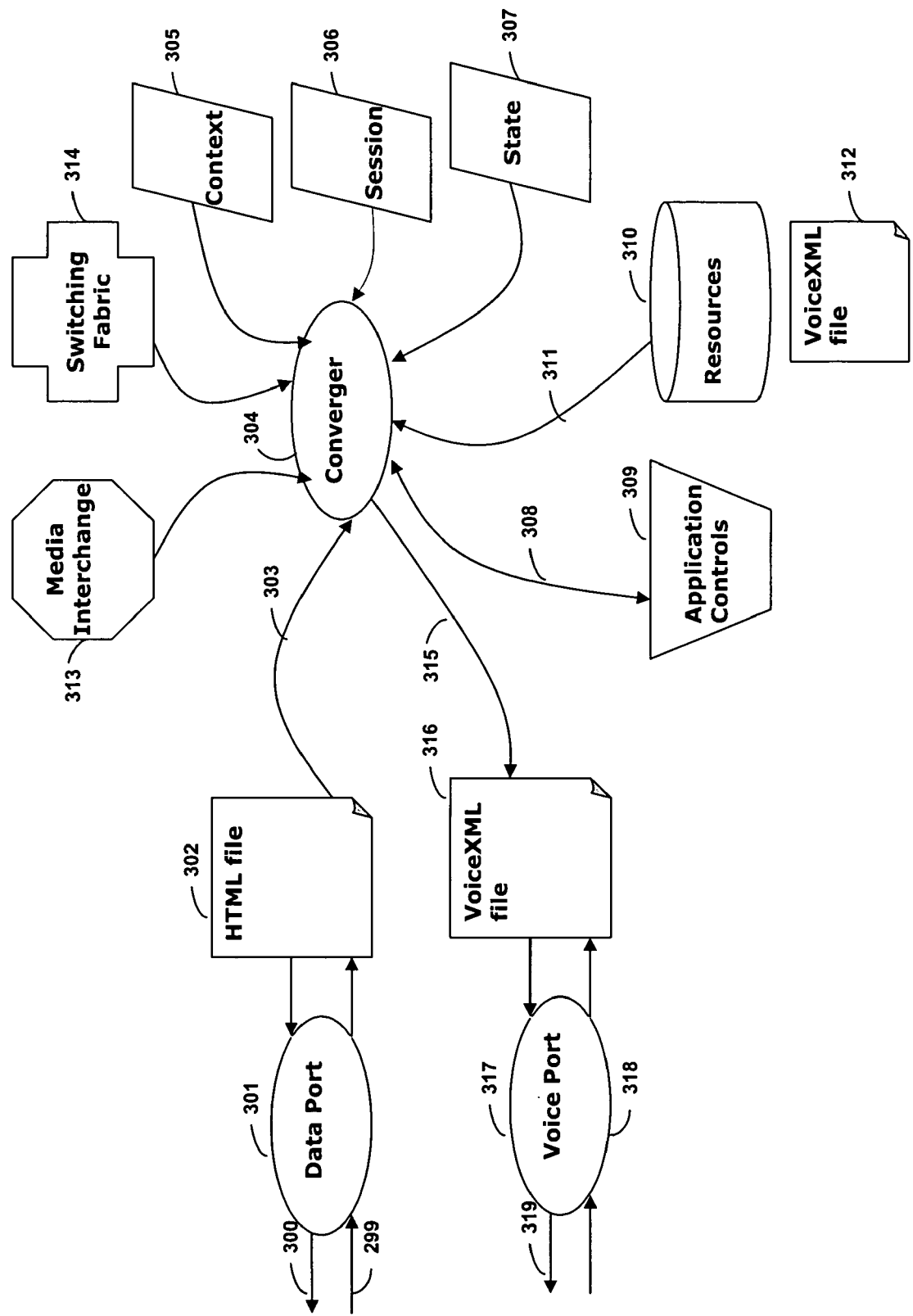
FIG. 27 is a flow chart of system operations of the voice and data operational engine.

Referring to FIG. 27, a user viewing the conferencing dashboard from a browser is viewing an HTML file that results in the flow of inbound data stream 299 over the data port 301. The content being delivered on the browser is a static or a dynamic HTML file 302. An HTML file by definition does not have any voice tags or provision to invoke voice application and therefore cannot offer concurrent voice interactivity. The converger 304 therefore relies on the actions embedded within each HTML file to interpret the next action. Each action corresponds to initiation of either a voice or data session over the appropriate channel. In order to determine the next action, the converger 304 retrieves the context 305, session 306, and state 305 of the transaction. After loading these variables, the converger 304 requests the application controls 309 over line 308. If it is determined that the next action is a voice session, then the converger 304 retrieves the resource manager repository 310 over line 311 to retrieve the appropriate static voiceXML file 312 that would be delivered over the new channel 319. In some cases the static file 312 is embedded with dynamic variables before delivery.

The next step is for the converger 304 to reformat and repurpose the content through the media interchange 313. Once the content is repurposed or reformatted, the switching fabric 314 switches the session from data to voice and submits the voiceXML 316 file via line 315 over the voice port 317 to the appropriate device 319. The aforementioned process illustrates the mechanism to invoke a parallel voice session to an existing data session. The reverse holds true as well, when an ongoing voice session invokes a parallel data session. By delivering voice and data files or dynamic content over multiple devices, a user simultaneously interacts with both voice and data.

The conferencing appliance 10 (FIG. 1) takes the two inbound streams of data, which were started independently, to convergence. The content from one stream is "mixed" with the content from another stream, thereby in effect joining (i.e., converging) the two streams of data.

To deliver a satisfying user experience in viewing and accessing data, any content delivered on a user's data device must not take copious amounts of/time to download or render. This is especially true with handheld devices that are connected via wireless connectivity. The appliance therefore delivers any shared content on a user's wireless device based upon device characteristics, the bandwidth and the network the device is on, and media stream. Generally available applications such as Microsoft Word, Microsoft PowerPoint presentation, Microsoft Excel are repurposed and reformatted before delivering to a handheld device. Each file is converted into an HTML file by using vendor provided DLLs and APIs (e.g., Microsoft DLLs and Microsoft APIs in this case), to convert a standard Microsoft document to an HTML format. Similarly, a standard PowerPoint file is converted into a number of HTML files using a commonly available scripting language such as PERL, VB Script and others. Once an HTML file is available, a DOM and SAX parser (another set of commonly available tools well known to those skilled in the art) are used to convert the HTML files into XML objects.

Each XML object is capable of being repurposed and reformatted to meet the needs of any type of device. For example, for a 4 line by 40 character device connected over a 9.6 Kbps network, a colored background with fancy graphics and animation may not be reasonable, especially given the low bandwidth of network connection. In this specific case, a set of objects with back-and-white images is reformatted for an optimal viewing experience. Similarly, every file being uploaded for conferencing is probably compressed, resized, reformatted and generally optimized. In some cases, the file may not be optimized during the time it is being uploaded, but rather is repurposed during runtime. The objective is to allow participants to view their PowerPoint presentations, Word documents, Excel spreadsheets and other files to be seen from handheld devices while they are mobile. As new devices emerge and network bandwidth improves, the mechanisms for optimization may evolve and improve as well.

Figure 28:
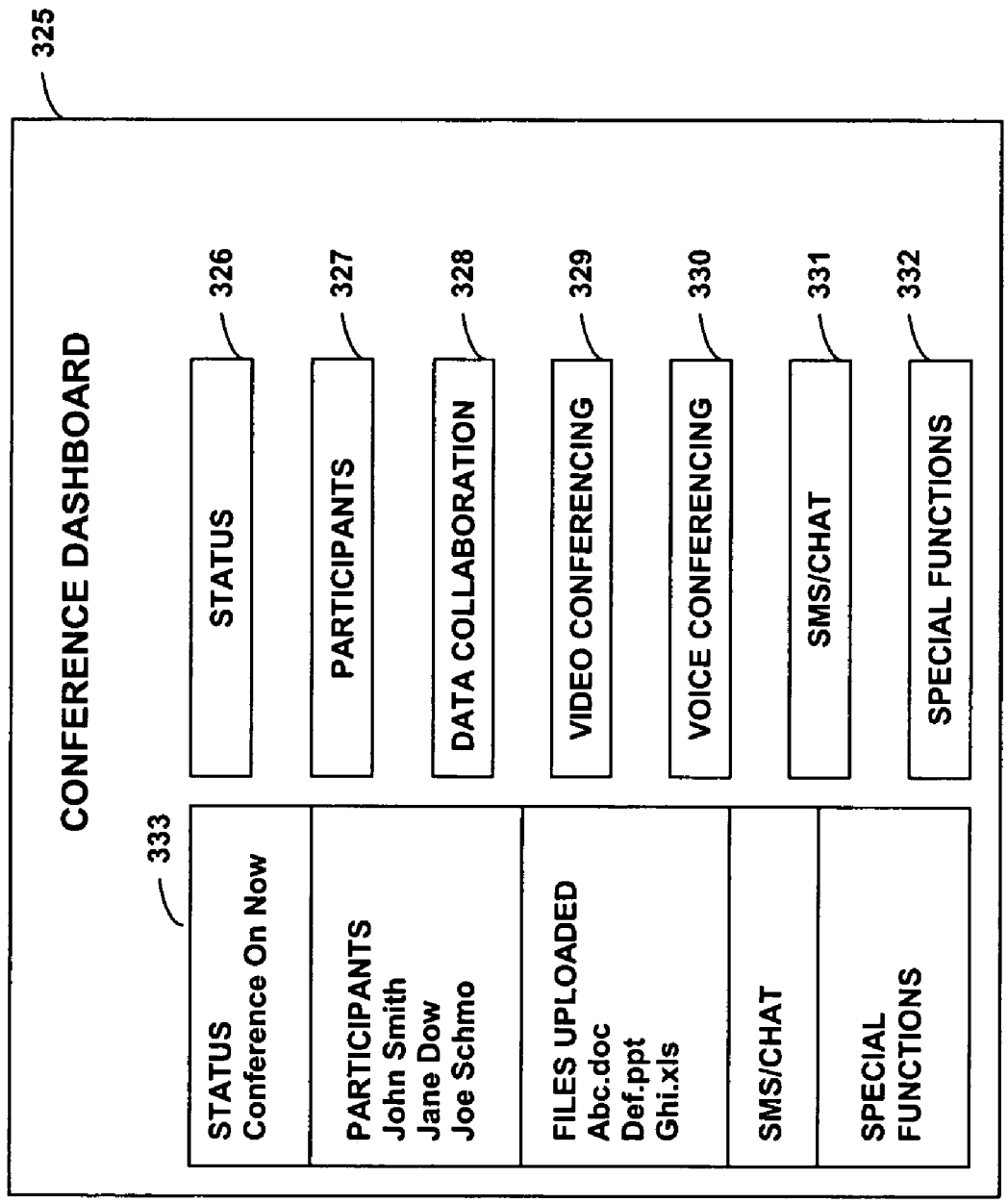
FIG. 28 is a block diagram depicting the conferencing dashboard.

Referring now to FIG. 28, there is shown a block diagram of a high level overview of the conferencing dashboard 325. A conferencing data dashboard enables conference participants to operate, administer, manage and interact with the conference. Participants can view the status 326 of the conference. Status 326 includes the start time, end time, lapsed time, time zone and other variables. Participants can also view from a graphical interface the status of all the participants. Those joined and active, for example, may be marked with green icons and those who are not active may be marked as red. A conference host controls a series of programming controls for each participant. For instance, a host can "mute" a specific user or "disconnect" him from the conference. The mute option initiated from the data side on the dashboard makes the voice channel mute. Participants can click the data collaboration icon 328 or hyperlink to view all the files being shared and presented. Each user within the conference has the right to upload and delete his own files. Files can be shared or collaborated with in real time.

Security on file sharing such as view only, downloadable, and password protection, is controlled by each participant. The video conferencing icon or hyperlink 329 enables the participants to view a real time picture of each participant assuming they have a mounted camera at each location. No special hardware is required as the image is transmitted over the IP network. The voice conferencing icon or hyperlink 330 gives the status of the voice conferencing session. This allows calls to be forwarded to another phone, enables new attendees to be included, provides callbacks and other telephony functions. The SMS, MMS and Chat link 331 enables participants to send instant messages or instant SMS and MMS messages over computers and mobile phones instantly. Messages could be sent as private messages to a subset or all of the conference participants. The special function icon or hyperlink 332 enables special voice and data sessions to be invoked. For instance, participants can request all shared files to be sent as emails or the email and contact information of each participant can be delivered to one user's email box. A status window 333 gives the status of the ongoing conference.

A conceptual dashboard enabling telephony functions is also available to those using a phone. Using special touchtone commands, participants can forward calls, join more parties to the call, deliver agenda and presentation to their email address invoke voice commands, whisper commands and do a number of other functions, as illustrated in FIG. 28. Some of these result in invoking data commands such as receiving email and contact information of all participants via email.

Figure 30:
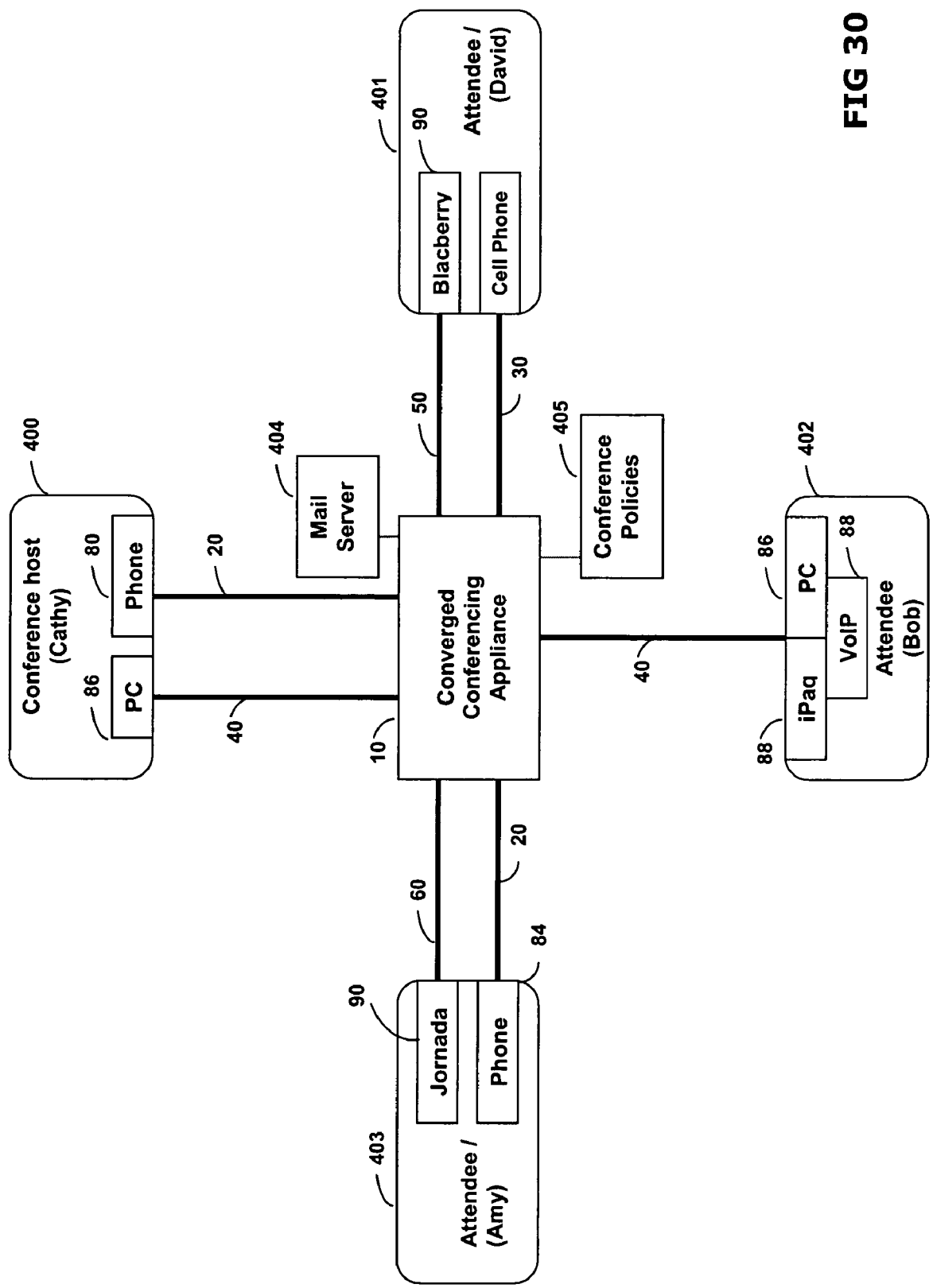
FIG. 30 is a structured flow chart depicting a conference session setup and tear down procedure.

FIG. 30 shows a converged conference scenario illustrating a 14 step process in which participants use both voice to confer with each other and data to collaborate within the same session. They may be using their mobile phones, PSTN phones or VoIP phones for voice and they may be using their laptop, desktop PC, Blackberry, Palm V or HP Jornada type devices to share and collaborate with data. The sample session hereinbelow described illustrates four users participating in the session, one of whom is the conference host or presenter. Each of them is connected with different devices but each participates in a converged conference session. Any number of users can participate within the scope of the invention.

The conference host (Cathy) initiates the conference from her office from the PC and by dialing on the phone number of the MCB switch. Attendee number 1 (Amy) participates in the conference via her mobile phone and her HP Jornada handheld wireless device. Attendee number 2 (Bob) participates in the conference via his Compaq ipaq or PC through VoIP because he is located internationally or is in a hotel where toll charges are at a premium. As a result he wants to use VoIP to connect for voice. Additionally, he does not want to sacrifice his data-session. He also wants data from the same device (be it ipaq handheld or PC laptop) as he goes through the conference. Attendee number 3 (David) participates from his mobile phone and BlackBerry handheld device.

Cathy, the conference host, sets up the conference by either calling via her phone or connecting to the URL of the switch via her IP connected PC or wirelessly connected handheld device. When she calls, she is greeted by an automated conference setup routine that asks her for the various conference parameters such as duration of the conference, participants, email, if available, their contact information, if available, etc.

The conference setup parameters and configuration are stored in a persistent repository. If Microsoft Exchange module is enabled and the list of attendees is referenceable from Exchange, then the switch retrieves the email and contact information of the attendees.

Amy gets a callback on her phone, as that is her preferred method of callback whenever she is scheduled into a conference. She saves the conference time and schedule. Bob is perhaps traveling internationally and has defined his policy that he should be notified about the conference via an email and an SMS message, if the conference is to be held within four hours, because he is often on the road and he wants to be notified immediately. An SMS message is sent to Bob regarding the conference. David prefers not to be notified by either phone callback or SMS but prefers email. He is often on the road and does not want to get interrupted with SMS messages or phone calls as he prefers to take customer calls during the day. He checks his email on his Blackberry device at his discretion. An email is sent to David that he can see when he wants to.

On the day and time of the conference, Cathy, the conference host, logs into the conference through her PC and her PSTN phone. David, who is mostly on the road, receives gets a message on his Blackberry device that the conference has started. He acknowledges that he desires to join the conference and he is immediately connected. He sees the first page of the presentation with the Agenda. He can ask for a phone callback on his mobile phone or, in this case, he prefers to dial the MCB himself. He enters his meeting number and password and he is authenticated. After authentication, he is logged in and can talk with and listen to Cathy.

As Amy prefers a phone call, she receives a callback from the MCB switch. She authenticates via touchtone keypad and is authorized access. She can talk with and listen to both Cathy and David, the other two attendees who have already connected. She enters, on her Jornada's browser, a specific URL (by clicking a link in her email) and is greeted with the MCB security screen. After proper authentication, she is able to see the first page of the Agenda. Bob, the attendee who is participating from overseas to save toll charges, uses VoIP over his PC. When traveling, he prefers to use his iPaq through VoIP. The MCB switch establishes a VoIP session with the ipaq over wireless network or a VoIP with the PC. Bob can "talk" through his PC and view the first slide of the presentation.

After all the attendees have been connected, Cathy, the conference host, talks from her phone and gives the presentation from her browser. Each user, whether on his wireless handheld device or on his phone, is able to view the data and speak in the conference. Because David is generally on the road, Amy wants to make sure that he has downloaded the specific work document that will also be discussed. She sends an instant message to David.

Each user can also use some "whisper" commands and download additional information. For example, David can issue a whisper command to download a word document because he did not download the copy earlier. This download process is transparent to other conference attendees. In initiating the conference, Cathy also broadcasts a copy of a new price sheet to all the attendees. Each user can download it by clicking an icon that appears on his screen.

Since other modifications such as in optical configurations can be made to fit particular operating specifications and requirements, it will be apparent to those skilled in the art that the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A data converging appliance, for converging at least one media format with at least one other media format, comprising:
   a) a first data input/output (I/O) port for receiving and transmitting data of a first data type to and from a first device having a first device type and being adapted to send and receive data of said first data type, said first device being operably connected to said first I/O port;
   b) a second data (I/O) port for receiving and transmitting data of a second data type to and from a second device having a second device type and being adapted to send and receive data of said second data type, said second device being operably connected to said second I/O port;
   c) a third data (I/O) port for receiving and transmitting data of at least one of said first data type and said second data type to and from a third device adapted to send and receive data of at least one of said first data type and said second data type, said third device being operably connected to said third I/O port; and
   d) means for formatting data disposed between at least two of said first, second, and third I/O ports for formatting data from at least one of said first, second and third devices into a form compatible with at least one other of said first, second, and third devices, thereby allowing synchronous delivery of a plurality of formatted data types;
at least two of said first, second, and third devices being used substantially simultaneously by a single user for concurrently sending and receiving data of said first and second data types on at least two respective ones of said first, second, and third devices.

2. The data converging appliance in accordance with claim 1, further comprising at least one broadband port for facilitating communications with broadband devices and residential gateways.

3. The data converging appliance in accordance with claims 2, further comprising at least one wireless port for facilitating communications with wireless devices.

4. The data converging appliance in accordance with claim 1, further comprising:
   e) means for scheduling conferences.

5. The data converging appliance in accordance with claim 1, further comprising:
   e) means for sending conference notifications.

6. the data converging appliance in accordance with claim 1, further comprising:
   e) means for initiating a session from a device.

7. the data converging appliance in accordance with claim 1, further comprising:
   e) means for initiating a data free voice conferencing session.

8. The data converging appliance in accordance with claim 1, further comprising:
   e) means for initiating a voice free data conferencing session.

* * * * *